United States Patent
Yoda et al.

(10) Patent No.: US 8,234,884 B2
(45) Date of Patent: Aug. 7, 2012

(54) AIR-COOLING/TEMPERING APPARATUS AND AIR-COOLING/TEMPERING METHOD FOR A GLASS SHEET

(75) Inventors: Kazushige Yoda, Tokyo (JP); Nozomi Otsubo, Tokyo (JP); Tomohiro Yonemichi, Tokyo (JP); Yasumasa Kato, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/895,458

(22) Filed: Sep. 30, 2010

(65) Prior Publication Data

US 2011/0016921 A1    Jan. 27, 2011

Related U.S. Application Data

(63) Continuation of application No. PCT/JP2009/056510, filed on Mar. 30, 2009.

(30) Foreign Application Priority Data

Mar. 31, 2008  (JP) ................................. 2008-093474

(51) Int. Cl.
C03B 13/16    (2006.01)

(52) U.S. Cl. .............. 65/370.1; 65/114; 65/348; 492/16

(58) Field of Classification Search .................... 65/104, 65/106, 114, 348, 351, 95, 115, 102, 370.1; 492/16

See application file for complete search history.

(56) References Cited

U.S. PATENT DOCUMENTS

| | | |
|---|---|---|
| 4,123,246 A | 10/1978 | Johnson |
| 4,711,655 A | 12/1987 | Schultz |
| 4,822,398 A * | 4/1989 | McMaster et al. .............. 65/273 |
| 5,011,525 A | 4/1991 | McMaster |

(Continued)

FOREIGN PATENT DOCUMENTS

EP    0 114 168 A1    8/1984

(Continued)

OTHER PUBLICATIONS

International Search Report issued Apr. 28, 2009 in PCT/JP2009/056510 filed Mar. 30, 2009.

(Continued)

*Primary Examiner* — Matthew Daniels
*Assistant Examiner* — Yana Belyaev
(74) *Attorney, Agent, or Firm* — Oblon, Spivak, McClelland, Maier & Neustadt, L.L.P.

(57) ABSTRACT

The present invention provides an air-cooling/tempering device and an air-cooling/tempering method for a glass sheet, which are capable of uniformly air-cooling and tempering a glass sheet as a whole without being affected by the pitch between adjacent rollers and a roller diameter.
The roller body of each roller forming the air-cooling/tempering device includes a rotary shaft formed of a guide shaft permitting a bendable action; and a plurality of ring rollers carried on the guide shaft and engaged and coupled with adjacent ring rollers; and disc rollers fixedly carried at intervals on ring rollers so as not to overlap the disc rollers on an adjacent roller with respect to a conveying direction of the glass sheet. Further, outlet modules are disposed on ring rollers between adjacent disc rollers through bearings so as to be rotatable with respect to the rotary shaft.
The coupled ring rollers can curve the guide shaft to curve the roller body, and the glass sheet is air-cooled and tempered by blowing cooling air to the glass sheet from the outlet modules while the glass sheet is conveyed by the disc rollers rotated via the ring rollers.

13 Claims, 16 Drawing Sheets

U.S. PATENT DOCUMENTS

| | | |
|---|---|---|
| 5,045,103 A | 9/1991 | McMaster et al. |
| 5,273,568 A | 12/1993 | McMaster et al. |
| 5,846,281 A | 12/1998 | Nikander et al. |
| 6,192,710 B1 * | 2/2001 | Takeda et al. ............... 65/107 |
| 6,363,753 B1 | 4/2002 | Yoshizawa et al. |
| 6,378,339 B1 | 4/2002 | Zalesak et al. |
| 6,598,427 B1 | 7/2003 | Douche et al. |
| 6,722,160 B1 | 4/2004 | Nemugaki et al. |
| 2005/0061032 A1 * | 3/2005 | Yoshizawa ................. 65/106 |
| 2006/0144090 A1 | 7/2006 | Yoshizawa |
| 2009/0229309 A1 | 9/2009 | Nomura et al. |

FOREIGN PATENT DOCUMENTS

| | | |
|---|---|---|
| EP | 0 968 970 A2 | 1/2000 |
| EP | 1 020 412 A1 | 7/2000 |
| JP | 2000-44264 | 2/2000 |
| JP | 2000-72460 | 3/2000 |
| JP | 2000-169170 | 6/2000 |
| JP | 2000-290030 | 10/2000 |
| JP | 2001-2434 | 1/2001 |
| JP | 2001-2435 | 1/2001 |
| JP | 2002-121043 | 4/2002 |
| JP | 2003-176144 | 6/2003 |
| JP | 2004-59401 | 2/2004 |
| JP | 2004-508264 | 3/2004 |
| WO | WO 89/01458 A1 | 2/1989 |
| WO | WO 9855412 * | 10/1998 |
| WO | WO 02/20417 | 3/2002 |
| WO | WO 2004018372 * | 4/2004 |
| WO | WO 2004/035492 | 4/2004 |

OTHER PUBLICATIONS

U.S. Appl. No. 13/044,103, filed Mar. 9, 2011, Fukami, et al.
Extended European Search Report issued Jun. 22, 2011, in Patent Application No. 09727281.9.

* cited by examiner

AIR-COOLING/TEMPERING APPARATUS AND AIR-COOLING/TEMPERING METHOD FOR A GLASS SHEET

TECHNICAL FIELD

The present invention relates to an air-cooling/tempering apparatus and an air-cooling/tempering method for tempered glass, which is used for transportation vehicles, such as automobiles, ships, rail vehicles, airplanes, for buildings or for various other applications.

BACKGROUND ART

U.S. Pat. No. 4,123,246 (hereinafter, Patent Document 1) discloses a bending apparatus wherein a glass sheet, which has been heated to a temperature close to its softening point by a heating furnace so as to be bendable, is bent by being conveyed on a roller conveyor having a curved plane defined by plural rollers. By this apparatus, the softened glass sheet swags by its own weight, being bent so as to follow the curvature of the conveying plane defined by the roller conveyor. In this case, the glass sheet is bent in a direction perpendicular to the conveying direction.

JP-A-2000-72460 (hereinafter, Patent Document 2) discloses a bending apparatus wherein a glass sheet, which has been heated to a temperature close to its softening point by a heating furnace, is partly bent in a glass sheet conveying direction by vertically moving rollers of a roller conveyor in accordance with a conveying position of the glass sheet while being conveyed along the conveying plane defined by plural rollers of the roller conveyor. In this case, the glass sheet is bent along the conveying direction.

The bending apparatuses disclosed in the above-mentioned two Patent Documents 1 and 2 can bend a softened glass sheet so as to follow a curved conveying plane because of swaging along the curved conveying plane by its own weight.

On the other hand, JP-A-2000-44264 (hereinafter, Patent Document 3) and JP-A-2000-290030 (hereinafter, Patent Document 4) disclose air-cooling/tempering apparatuses for a glass sheet.

While these air-cooling/tempering apparatuses covey, on a roller conveyor, a glass sheet which has been taken out of a hearing furnace and has been heated to a high temperature, these apparatuses air-cool and temper the glass sheet by injecting air toward a portion of the glass sheet between adjacent rollers of the roller conveyor from box-like outlets disposed between the adjacent rollers.

Further, JP-A-2001-2434 (hereinafter, Patent Document 5) and JP-A-2001-2435 (hereinafter, Patent Document 6) disclose air-cooling/tempering apparatuses which inject air toward a portion of a glass sheet between adjacent rollers of a roller conveyor from box-like outlets disposed between the adjacent rollers while vertically moving the outlets in synchronization with vertical movement of respective rollers. These air-cooling/tempering apparatuses perform air-cooling/tempering operation while vertically moving respective rollers of the roller conveyor so as to keep the glass sheet in a bent shape formed by a bending apparatus before an air-cooling/tempering apparatus (see Patent Documents 1 and 2). These air-cooling/tempering apparatuses can uniformly temper the glass sheet at a whole since outlet modules vertically move so as to follow the rollers in order to make the distance between each of the outlet modules and the glass sheet constant.

DISCLOSURE OF THE INVENTION

Problems that the Invention is to Solve

However, the air-cooling/tempering apparatuses disclosed in Patent Documents 3 to 6 inject air toward a portion of a glass sheet between adjacent rollers of a roller conveyor by disposing outlets between the adjacent rollers. In such arrangement, air for air-cooling/tempering operation is difficult to be brought to portions of a glass sheet in contact with rollers and portions of the glass sheet close thereto in particular when the rollers have a large diameter. This causes a problem in that it is difficult to air-cool/temper a glass sheet in a satisfactory way because a reheating phenomenon (phenomenon that cooling and non-cooling are alternatively applied) is caused in the glass sheet.

FIG. 16 is a schematic side view of an air-cooling/tempering apparatus for explanation of such a reheating phenomenon. While a glass sheet G is conveyed by rollers 210, the glass sheet G is air-cooled and tempered by air for air-cooling/tempering operation, which is supplied from lower outlets 212 and upper outlets 214 disposed between adjacent rollers 210 as shown in FIG. 16. However, portions of the glass sheet G1 (portions of the glass sheet in contact with rollers and portions of the glass sheet close thereto), which are shown as shaded portions in FIG. 16, are difficult to receive the air for air-cooling/tempering operation. At the moment shown in this figure, the glass sheet G has cooled portions and non-cooled portion G1. At the next moment, the non-cooled portions G1 are cooled because of advancing to locations to receive the air for air-cooling/tempering operation by movement of the glass sheet G1 in a conveying direction. On the other hand, the portions of the glass sheet that have been cooled in the previous moment are not cooled at this stage because of advancing to locations corresponding to the portions G1 of the glass sheet in contact with rollers and the portions G1 of the glass sheet close thereto. The surface temperature of the portions G1 that are not cooled at this stage is instantly increased by the heat in the glass sheet G since the portions G1 are not cooled at this stage. This is the reheating phenomenon. This phenomenon causes a problem in that it becomes difficult to generate residual stresses required for tempered glass since the temperature difference in the thickness direction of a glass sheet is mitigated.

This problem can be reduced by spreading the pitch between adjacent rollers or decreasing the diameter of rollers so as to secure a widened spacing between the adjacent rollers and disposing outlets in the widened spacings. However, spreading the pitch between adjacent rollers is not an effective measures since when a small-sized glass sheet is conveyed, such a small-sized glass sheet is likely to fall into the widened spacing between adjacent rollers or to have an end portion brought into contact with a portion of a roller lower than the conveying plane even if a small-sized glass sheet escapes from falling. When a small-sized glass sheet is conveyed, the pitch between adjacent rollers has been required to be narrowed, where it is impossible to secure a spacing enough to dispose an outlet module between adjacent rollers in some cases. There is a limitation to a reduction in the diameter of rollers from the point of view of securing a required rigidity.

The air-cooling/tempering apparatuses disclosed in Patent Documents 5 and 6 have box-shaped outlets disposed in a direction perpendicular to the conveying direction of a glass sheet such that the outlets vertically move so as to follow the vertical movement of rollers. These apparatuses have a problem in that when using curved rollers curved in a direction perpendicular to the conveying direction of a glass sheet, i.e.

when air-cooling/tempering a glass sheet curved in a direction perpendicular to the conveying direction of the glass sheet, it is impossible to uniformly air-cool and temper the glass sheet as a whole.

FIG. 17 is a schematic front view for explanation of the problem caused when air-cooling/tempering operation is performed with such curved rollers being used. When a glass sheet G, which is curved in a direction perpendicular to the conveying direction, is conveyed by curved rollers 200 while air is injected toward the glass sheet passing on the rollers from between adjacent rollers so as to be air-cooled and tempered, the distances from leading edges of the lower and upper outlets 202 and 204 to the glass sheet are different between a central portion and the side edge portions of the glass sheet G as shown in FIG. 17. This causes a problem in that the travel length of the injected air to the glass sheet is not uniform over the glass sheet as a whole with the result that it is difficult to uniformly air-cool and temper the glass sheet as a whole.

By the way, it is said that the vertical component of air injected from an outlet contributes to air-cooling/tempering operation. In other words, for example, when air is brought into contact with a glass sheet surface at an angle of 45 degrees, cooling power is obtained only by about 50% of the cooling power that is obtained when the air is brought into vertical contact with the glass sheet surface. For this reason, particularly when a backlite that has side edge portions complicatedly curved is subject to air-cooling/tempering operation, it is difficult to vertically bring air into contact with the side edge portions in the above-mentioned conventional air-cooling/tempering apparatuses with the result that it is difficult to provide the side edge portions with a desired tempering treatment.

In consideration of the above-mentioned circumstances, it is an object of the present invention to provide an air-cooling/tempering apparatus and an air-cooling/tempering method for a glass sheet, which are capable of uniformly air-cooling and tempering a glass sheet as a whole without being affected by the pitch between adjacent rollers and a roller diameter.

Means of Solving the Problems

In order to attain the above-mentioned object, the present invention provides an air-cooling/tempering apparatus for a glass sheet, which is adapted to heat a glass sheet to a temperature by a heating furnace, and to air-cool and temper the glass sheet by conveying the heated glass sheet along a conveying plane defined by a plurality of rollers of a roller conveyor while air is blown toward a bottom side of the glass sheet conveyed by the roller conveyor, characterized in that each of the rollers of the roller conveyor includes a rotary shaft; a plurality of disc members carried on the rotary shaft at intervals and configured to have contact with the bottom side of the glass sheet; and lower outlet modules disposed so as to be swingable with respect to the rotary shaft, each of the lower outlet modules being disposed between adjacent disc members and having an air injection port formed on a side confronting the glass sheet.

In accordance with the present invention, since each of the lower outlet modules is disposed between adjacent disc members carried on the rotary shaft of each of the rollers, it is possible to bring air from the lower outlet modules to a portion of the glass sheet in contact with the disc members and its close portion, i.e. portions of the glass sheet that have not been supplied with such air in the conventional air-cooling/tempering apparatuses. Thus, it is possible not only to prevent the reheating phenomenon from causing in the glass sheet but also to uniformly air-cool and temper the glass sheet as a whole. Although each of the lower outlet modules may have a single air injection port formed thereon, it is preferred that each of the lower outlet modules have many air injection ports formed thereon. When each of the lower outlet modules has many air injection ports formed thereon, it is preferred that the air injection ports include a first group of air injection ports for vertically bringing air to the glass sheet conveyed just above the roller with said air injection ports and a second air injection ports for obliquely bringing air to the glass sheet passing between adjacent rollers.

It is preferred that the disc members be disposed at positions so as not to overlap the disc members on an adjacent roller with respect to a conveying direction of the glass sheet.

When the disc members are disposed as described above, the disc members on a roller are disposed at positions so as not to overlap the disc rollers on an adjacent roller with respect to the conveying direction of the glass sheet, with the result that a portion of the glass sheet that has been brought into contact with the disc rollers on said roller is reliably air-cooled by the air injected from the outer modules on the next roller when passing on the next roller. Thus, it is possible to prevent the reheating phenomenon from causing in such a portion of the glass sheet that has been brought into contact with the disc rollers on said roller.

It is preferred that each of the lower outlet modules have an inclined surface in the conveying direction of the glass sheet, and the air injection port is formed in the inclined surface.

By forming the air injection ports on the inclined surfaces of the lower outlet modules as described above, it is possible to dispose the air injection ports such that points where air reaches the glass sheet from the air injection ports lie with substantially equal pitches on the glass sheet. Thus, it is possible to uniformly air-cool and temper the glass sheet as a whole. In particular, when each of the lower outlet modules has many air injection ports formed thereon, it is preferred that the air injection ports include a first group of air injection ports for vertically brining air to the glass sheet passing just above the roller with said first group of air injection ports, and a second group of air injection ports formed on the inclined surface of each of the lower outlet modules for obliquely brining air to the glass sheet passing just above the roller with said second group of air injection ports such that air reaches the glass sheet with substantially equal pitches.

In the present invention, it is preferred that there is provided a drive unit for vertically moving the plurality of rollers such that the drive unit vertically moves the plurality of rollers according to a conveyed position of the glass sheet so as to curve a portion of the conveying plane in the conveying direction of the glass sheet.

By vertically moving the plurality of rollers according to a conveyed position of the glass sheet, it is possible to move the respective rollers of the roller conveyor upward and downward to curve the conveying plane such that the glass sheet keeps its shape bent by a bending apparatus before the air-cooling/tempering apparatus, i.e. its shape bent along the conveying direction of the glass sheet. It is possible to air-cool and temper the bent glass sheet while the bent glass sheet is conveyed in such a state that the bent glass sheet is positioned on the curved conveying plane and the curved conveying plane is shifted in the conveying direction according to the conveyance of the glass sheet by vertically moving the respective rollers. In accordance with the present invention, it is possible to uniformly temper the glass sheet as a whole since the lower outlet modules are vertically moved along with their rollers so as to constantly make the distance between each of the lower outlet modules and the glass sheet constant.

It is preferred that the plurality of rollers be bendable rollers, which are bendable in a direction perpendicular to the conveying direction of the glass sheet.

The adoption of such bendable rollers as the rollers is appropriate to convey a glass sheet, which has a complicatedly curved shape bent in both of the conveying direction of the glass sheet and a direction perpendicular thereto. Even if the glass sheet is a backlite having a peripheral edge portion formed in a complicatedly bent shape, it is possible to direct the air outlet ports of the outlet modules toward the bottom side of the glass sheet even at the peripheral edge portion of the glass sheet and to make the distance between each of the air injection ports and the glass sheet equal on the glass sheet as a whole without having any difference between a central portion and the peripheral edge portion of the glass sheet since the rollers are curved along the shape of the peripheral edge portion. Further, it is possible to temper even a peripheral edge portion formed in a complicatedly bent shape as in the remaining portions of the glass sheet since air is vertically brought to such a peripheral edge portion of the glass sheet. Thus, it is possible to uniformly air-cool and temper the glass sheet as a whole even if the glass sheet has a complicated shape as in a backlite or the like.

In the present invention, it is preferred that there will be provided an outlet unit configured to inject air toward a top side of the glass sheet conveyed by the roller conveyor.

When air is also injected from the outlet unit toward a top side of the glass sheet as well, it is possible to effectively temper the glass sheet since the glass sheet is simultaneously tempered from both of the top side and the bottom side of the glass sheet. The outlet unit may include known outlets, or upper outlet modules which have a similar structure to the lower outlet modules carried on the rollers.

In the present invention, it is preferred that the outlet unit include a plurality of outlet supporting shafts disposed to confront the rollers of the roller conveyor, and a plurality of upper outlet modules carried on the outlet supporting shafts and having an air injection port formed on a side confronting the glass sheet. It is preferred from the point of view of uniformly air-cooling and tempering the glass sheet that the outlet unit, which injects air toward the top side of the glass sheet, include upper outlet modules which have a similar structure to the lower outlet modules.

In the present invention, it is preferred that there is provided a drive unit for vertically moving the outlet supporting shafts such that the drive unit vertically moves the plurality of outlet supporting shafts according to a conveyed position of the glass sheet.

When there is provided such a drive unit for vertically moving the outlet supporting shafts, it is possible to air-cool and temper the glass sheet while the respective outlet supporting shafts are moved upward and downward, following the shape of the glass sheet bent by the bending apparatus before the air-cooling/tempering apparatus, i.e. the shape of the glass sheet bent along the conveying direction of the glass sheet. In accordance with the present invention, it is possible to uniformly temper the glass sheet since the distance between each of the upper outlet modules and the glass sheet can be made constant at all times.

In the present invention, it is preferred that the plurality of outlet supporting shafts be bendable rollers.

When the outlet supporting shafts are configured to be bendable as described above, it is possible to dispose the upper outlet modules so as to follow the bent shape of the glass sheet. Thus, this arrangement contributes to uniformly cool the glass sheet since air can be substantially vertically brought to the upper side of the glass sheet from the upper outlet modules.

In order to attain the above-mentioned object, the air-cooling/tempering method according to the present invention is characterized in that the method includes heating a glass sheet to a temperature by a heating furnace, and air-cooling and tempering the heated glass sheet by use of the air-cooling/tempering apparatus for a glass sheet according to the present invention while the heated glass sheet is conveyed along the conveying plane defined by the plurality of rollers of the roller conveyor.

In accordance with the present invention, it is possible to uniformly air-cool and temper the glass sheet as a whole since the glass sheet is cooled by use of the roller conveyor, which has a lower outlet module disposed between adjacent disc members on the rotary shafts of the rollers.

In the present invention, it is preferred that the method control at least lower outlet modules so as to start air injection when the glass sheet conveyed by rollers has been entirely transferred into the air-cooling/tempering apparatus.

When air injection is carried out as described above, it is possible to more uniformly temper the glass sheet as a whole since the air injection from the air injection ports in an inlet area that is occupied by at least one glass sheet is stopped before the glass sheet is transferred into an air-cooling area of the air-cooling/tempering apparatus while air is injected from at least the lower outlet modules to carry out air-cooling operation when the glass sheet is entirely transferred into the air-cooling area of the air-cooling/tempering apparatus.

Effect of the Invention

As explained, in accordance with the air-cooling/tempering apparatus and the air-cooling/tempering method for a glass sheet according to the present invention, it is possible to uniformly air-cool and temper a glass sheet as a whole without being affected by the pitch between adjacent rollers and a roller diameter since the air-cooling and tempering operation is carried out by use of the roller conveyor, which has a lower outlet module disposed between adjacent disc members on the rotary shafts of the rollers.

EXPLANATION OF REFERENCE NUMERALS

10: Air-cooling/tempering apparatus, 12: Bending apparatus, 14: Heating furnace, 16: Forming furnace, 18: Motion controller, 20: Glass sheet, 22: Roller conveyor for bending operation, 24: Roller conveyor with outlet module, 26: Outlet unit, 28: Roller conveyor, 30: Vertically movable frame, 32: Bearing, 34: Servomotor, 36: Fixed frame, 38: Guide rail, 40: Guide block, 42: Rack, 44: Pinion, 46: Rotary shaft, 48: Bearing, 50: Servomotor, 64: Vertically movable frame, 66: Support, 67: Rack, 68: Rod, 69: Servomotor, 70: Coupling pipe, 72: Disc roller, 74: Bearing, 76: Guide shaft, 78: Bearing, 80: Band-shaped member, 82: Holding member, 84: Slide bearing, 86: Ring roller, 88: Outer cylinder, 90: Support, 92: Pin, 94: Bearing, 96: Bracket, 98: Pin, 100: Slider, 102: Guide, 104: Gear, 106: Gear, 108: Holder, 110: Servomotor, 112: Vertically movable rod, 114: Outer cylinder, 116: Servomotor, 118: Vertically movable rod

BEST MODE FOR CARRYING OUT THE INVENTION

Now, the air-cooling/tempering apparatus and the air-cooling/tempering method for tempered glass according to the present invention will be described in detail based on preferred embodiments in reference to the accompanying drawings.

Figure 1:
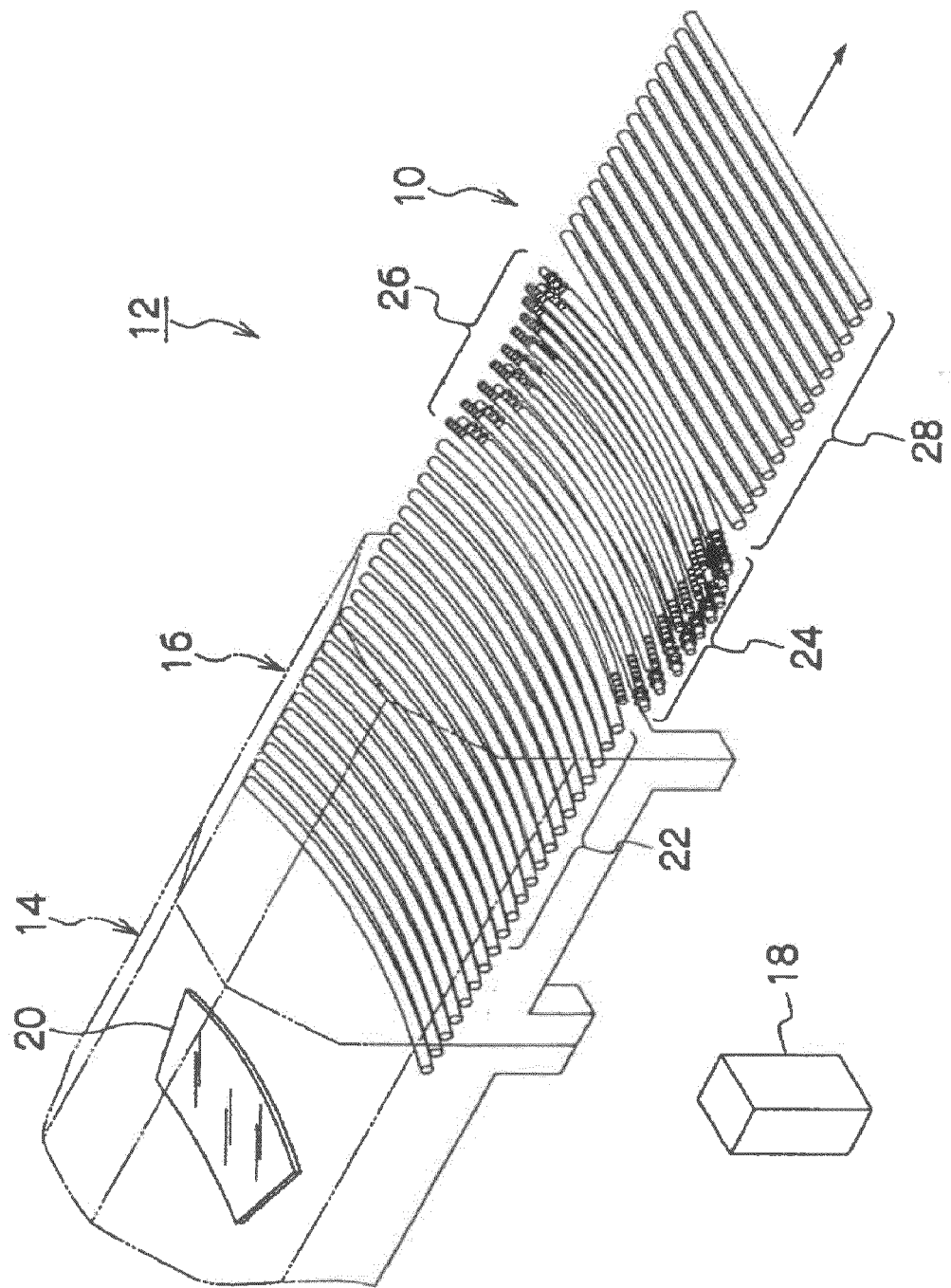
FIG. 1 is a perspective view showing the air-cooling/tempering apparatus for a glass sheet according to an embodiment of the present invention.
Figure 2:
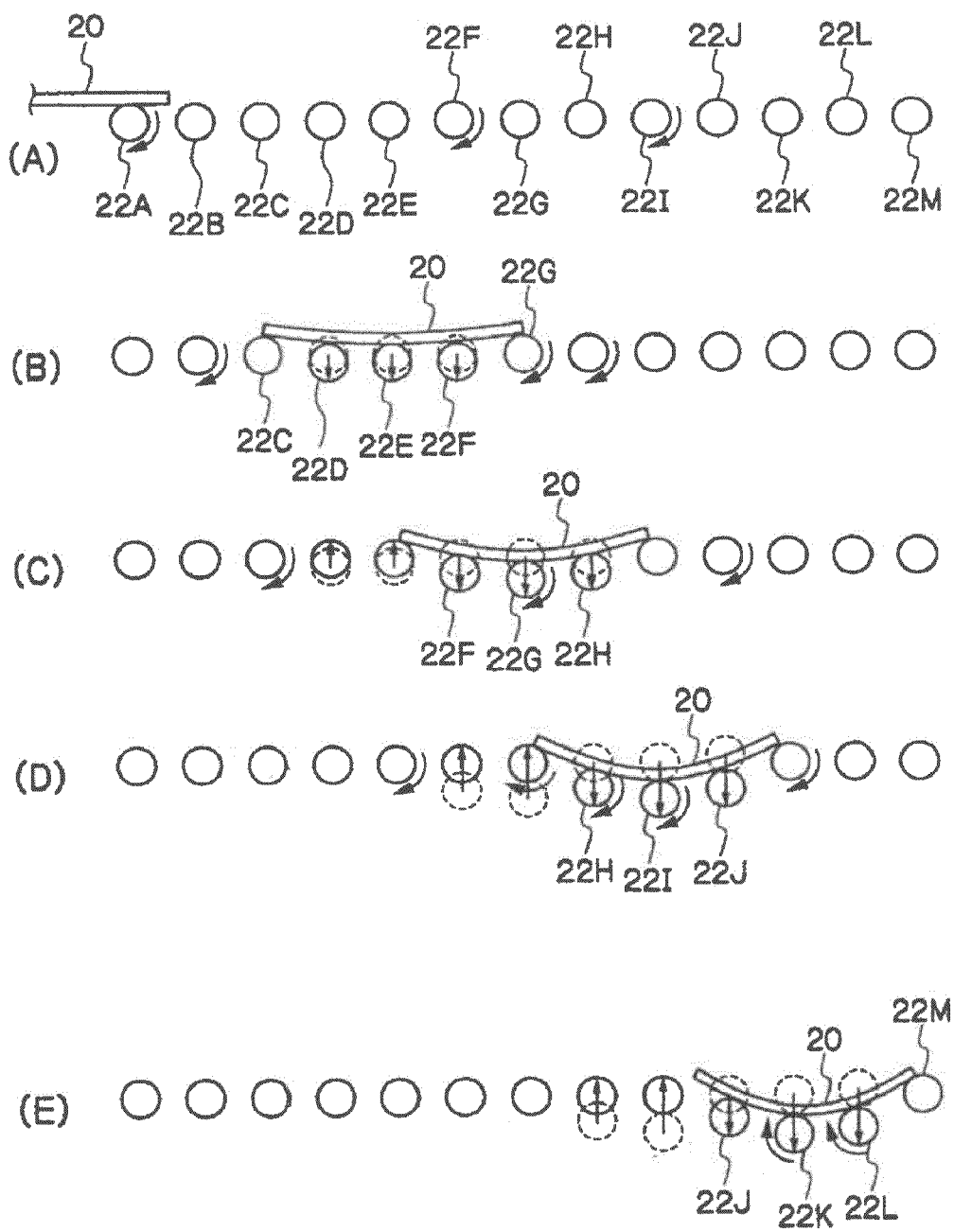
FIGS. 2(A) to (E) are schematic views explaining the vertical movement of bending rollers in accordance with a position where a glass sheet is located during conveyance.

FIG. 1 is a perspective view showing an embodiment of a glass sheet bending apparatus 12 containing a glass sheet air-cooling/tempering apparatus 10. The bending apparatus 12 shown in this figure is constituted by a heating furnace 14, a forming furnace 16 and the air-cooling/tempering apparatus 10. The drive control for each part of the bending apparatus 12 is performed by a motion controller 18 formed of a computer and so on.

A glass sheet 20 before bending is positioned to a conveying position at the entrance of the heating furnace 14 and is conveyed into the heating furnace 14 by a roller conveyor not shown. Then, the glass sheet is heated to a bending temperature so as to be bendable (about 600 to 700° C.) while being conveyed through the heating furnace 14. Although the glass sheet 20 is shown in FIG. 1 as a backlite for an automobile that will be bent into a complicated shape having a plurality of curved surfaces, the glass sheet is not limited to such a type of glass sheet.

The glass sheet 20, which is heated to the bending temperature while passing through the heating furnace 14, is conveyed into the forming furnace 16 installed downstream the heating furnace 14, and the glass sheet is bent by a bending roller conveyor 22 in the forming furnace 16 while being conveyed through the forming furnace.

A plurality of rollers forming the roller conveyor 22 are curved rollers configured to be curved in a convex form facing vertically downward, by which the roller conveyor 22 forms a conveying plane curved in a direction perpendicular to the conveying direction. The respective rollers of the roller conveyor 22 are vertically moved as in the propagation of a wave as shown in FIGS. 2(A) to (E) by an unshown elevating system. In this manner, the roller conveyor 22 has the conveying plane curved along the conveying direction. Thus, the glass sheet 20 is bent into a shape having curvatures in two directions by its own weight while being conveyed through the forming furnace.

Detailed explanation will be made about FIGS. 2(A) to 2(E). The respective rollers 22A to 22M forming the roller conveyor 22 are not only independently rotated by a rotary drive system (not shown) but also independently and vertically moved by the elevating system (not shown). As shown in FIGS. 2(A) to (E), the conveying plane for the glass sheet 20, which is curved in a convex form facing vertically downward by the rollers 22A to 22M, changes so as to follow the conveyance of the glass sheet, while increasing the curvature of the conveying plane from upstream toward downstream as in the propagation of a wave. Thus, the glass sheet 20 is bent, having a curvature gradually increasing by its own weight, being conveyed from upstream to downstream. The rotary drive system and the elevating system are controlled by the motion controller 18 shown in FIG. 1. Although rollers, which are curved in a convex form facing vertically upward, may be employed as the rollers, the rollers that are curved in a convex form facing vertically downward are more excellent from the point of view of stability in the conveyance of the glass sheet 20. Straight rollers may be employed instead of such curved rollers and form a conveying plane curved only in the conveying direction by being vertically moved. In such a case, the glass sheet 20 is bent so as to be curved only a direction along the conveying direction. The present invention is not limited to such bending method. The present invention is also applicable to a case where a glass sheet is nipped by upper and lower rollers. The present invention is also applicable to a case where a heated glass sheet is bent by being conveyed on curved rollers without vertically moving the rollers as described above. The present invention is applicable whatever bending method is adopted, such as press bending. Further, the present invention is also applicable to a flat glass sheet, which has not been bent. The present invention will be described in reference to embodiments where a glass sheet having curvatures in two directions is cooled since the present invention is also applicable to a case where a glass sheet having curvatures in two directions is air-cooled, which has been most difficult when the glass sheet is cooled, being conveyed on rollers.

The glass sheet 20, which has been bent in the forming furnace 16, is conveyed from the exit of the forming furnace 16 into the air-cooling/tempering apparatus 10 by a roller conveyor 24 with outlet modules or lower outlet modules (hereinafter, also referred to as the roller conveyor for short), and the glass sheet is air-cooled and tempered, being conveyed through the air-cooling/tempering apparatus.

The air-cooling/tempering apparatus 10 has the roller conveyor 24 disposed on a lower side and an outlet unit 26 disposed on an upper side with respect to the conveyed glass sheet 20. The glass sheet 20 that has been bent is air-cooled by air injected toward a bottom side of the glass sheet from the outlet modules (lower outlet modules) of the roller conveyor 24, which will be described later on, and air injected toward a top side of the glass sheet from the outlet unit 26. The glass sheet 20 that has been air-cooled and tempered is conveyed from the exit of the air-cooling/tempering apparatus 10 toward an inspection apparatus (not shown) as the next step by a roller conveyer 28. This is explanation of the bending step for the glass sheet 20 by the bending apparatus 12 and the air-cooling/tempering step for the glass sheet by the air-cooling/tempering apparatus 10. The cooling capacity of the air-cooling/tempering apparatus 10 may be appropriately set according to the thickness of the glass sheet 20 or the like.

Now, the structure of the air-cooing/tempering apparatus 10 will be described.

The air-cooling/tempering apparatus 10 air-cools and tempers the glass sheet 20 by blowing the above-mentioned air to the top side and the bottom side of the glass sheet 20 conveyed by the roller conveyor 24. The roller conveyor 24 is configured such that respective rollers are vertically movable as in the above-mentioned roller conveyor 22 for bending.

The roller conveyor 24 is constituted by a plurality of rollers 24A to 24J, which are curved in a direction perpendicular to the conveying direction of the glass sheet 20 and are horizontally disposed side by side in the conveying direction at certain intervals as shown in FIGS. 3(A) to (F). Each of the rollers 24A to 24J is not only independently rotated by a rotary drive system but also independently vertically moved by a system for vertical movement.

Now, the structures of the rotary drive system and the system for vertical movement will be described. Since the respective rollers 24A to 24J have the same rotary drive system and the same system for vertical movement, the rotary drive system and the system for vertical movement only for the roller 24A will be described, and the explanation of those of the other rollers 24B to 24J will be omitted.

Figure 4:
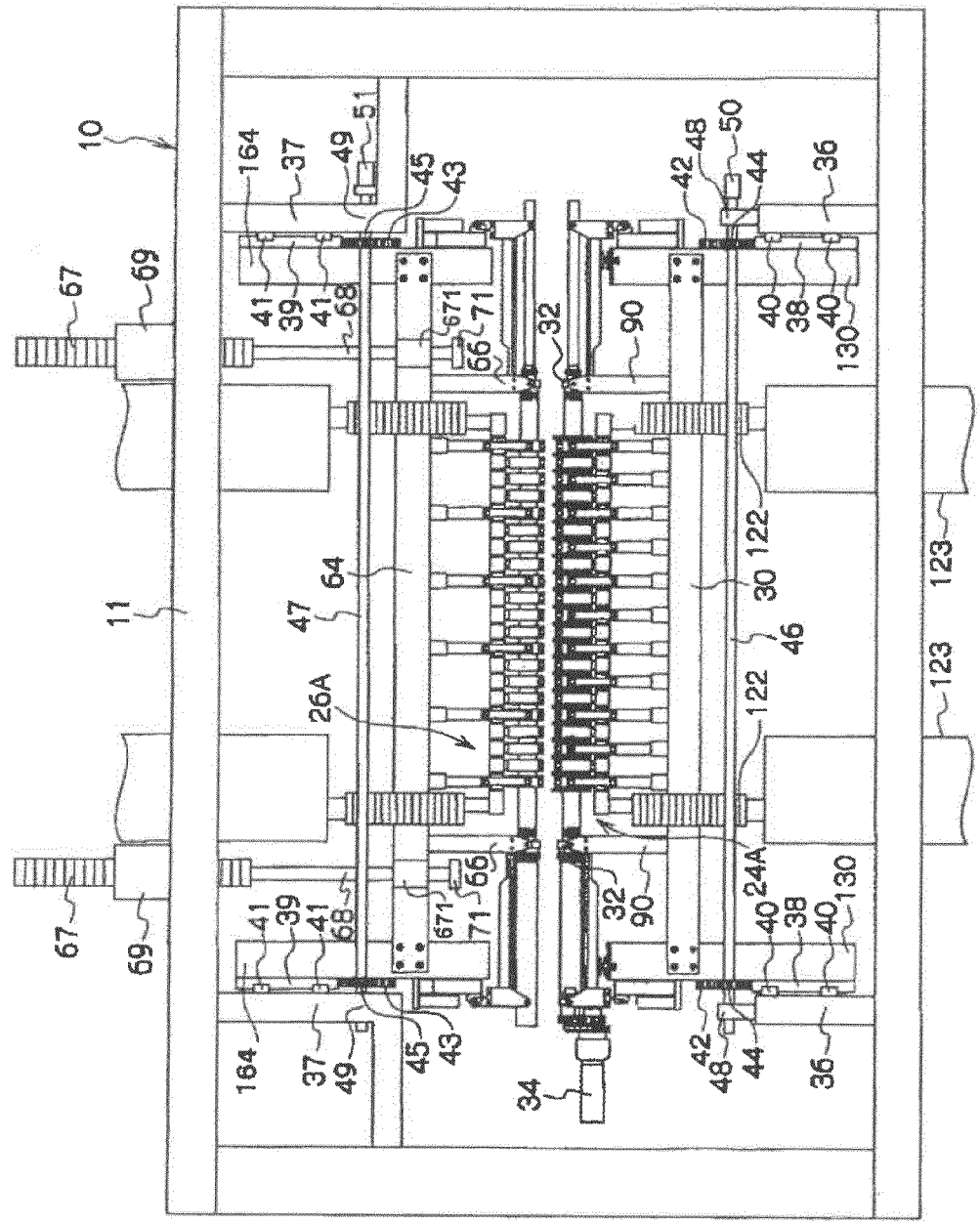
FIG. 4 is a front view of the air-cooling/tempering apparatus.

First, the rotary drive system will be described. The roller 24A is rotatably supported, having portions close to both ends supported by bearings 32 and 32 of supports 90 disposed on a vertically movable frame 30 as shown in FIG. 4. The roller 24A has one end (a left end in FIG. 4) coupled to the spindle of a servo motor 34 via a gear. The roller 24A is rotated at an angular speed by the servo motor 34 via the gear. This is explanation of the structure of the rotary drive system.

Next, the system for vertically movement will be described. The vertically movable frame 30 has both ends fixed to guide members 130 in a vertical direction, and the guide members 130 are supported so as to be vertically movable by fixed frames 36 and 36. Specifically, each of the guide members 130 has a guide rail 38 disposed in a vertical direction on an outer side thereof, and the guide rail 38 is slidably supported by guide blocks 40 and 40 fixed to an inner side of the corresponding fixed frame 36. The vertically movable frame 30 also has racks 42 and 42 disposed along the vertical direction on outer sides thereof, and the racks 42 and 42 mesh with pinions 44 and 44. The pinions 44 and 44 are fixedly carried on a rotary shaft 46, which has both ends pivotally supported by bearings 48 and 48 and has one end (a right end in FIG. 4) coupled to the spindle of a servo motor 50 disposed on the top of the corresponding fixed frame 36. The rotary shaft 46 is rotated by driving the servo motor 50, and the rotary movement of the rotary shaft is converted into linear movement by a combination of the pinion 44 and the rack 42 in each pair. Thus, the vertically movable frame 30 is vertically moved via the guide members 130. When the vertically movable frame 30 is vertically moved, the roller 24A is vertically moved. This is the explanation of the structure of the system for vertical movement.

The above-mentioned rotary drive system and the above-mentioned system for vertical movement are provided to the other rollers 24B to 24J as well. The servo motors 34 and 50 for these systems are all controlled by the motion controller 18 (see FIG. 1).

On the other hand, the outlet unit 26 is constituted by a plurality of outlet units 26A to 26J, which are curved in a direction perpendicular to the conveying direction of the glass sheet 20 and are horizontally disposed side by side in the conveying direction with intervals as shown in FIG. 3(A) to (F). The respective outlet units 26A to 26J are independently and vertically moved by systems for vertical movement. It should be noted that the respective outlet units 26A to 26J do not need to a system to generation an upper wave when there are no servomotors 116 (shown in FIG. 11) described later, in other words, when upper ring rollers 114 are so lightweight that the upper ring rollers can be flexed, taking use of bearings 681 as pivots, only by vertically moving the upper ring rollers 114 disposed at opposed ends. In this case, the outlet units may be combined with systems carried on the elevating systems of the lower roller conveyor 24, such as systems connecting between the bearings 32 and supports 66. In the latter case, the respective outlet units 26A to 26J are vertically moved in synchronization with the vertical movement of the lower rollers 24A to 24J.

Now, the structure of the system for vertically moving the outlet units 26 will be described. Since the outlet units 26A to 26J include the same system for vertical movement as each other, only the structure of the system for vertically moving the outlet unit 26A will be described, and the explanation of the systems for vertically moving the other outlet units 26B to 26J will be omitted.

As shown in FIG. 4, the outlet unit 26A has both ends supported by supports 66 and 66 disposed on a vertically movable frame 64. The vertically movable frame 64 has guide members 164 fixed to both ends in the vertical direction, and the guide members 164 are supported so as to be vertically movable by fixed frames 37 and 37. Specifically, the guide members 164 have guide rails 39 and 39 disposed on outer sides thereof along the vertical direction, and the guide rails 39 are slidably supported by guide blocks 41 and 41 fixed to inner sides of the fixed frames 37. The vertically movable frame 64 has racks 43 and 43 disposed along the vertical direction on outer sides thereof, and the racks 43 and 43 mesh with pinions 45 and 45. The pinions 45 and 45 are fixedly carried on a rotary shaft 47, which has both ends supported by bearing portions 49 and 49 and has one end (right end shown in FIG. 4) coupled to the spindle of a servo motor 51 disposed on the bearing portion 49. The rotary shaft 47 is rotated by driving the servo motor 51, and the rotary movement of the rotary shaft is converted into linear movement by a combination of the pinion 45 and the rack 44 in each pair. Thus, the vertically movable frame 64 is vertically moved. When the vertically movable frame 64 is vertically moved, the outlet unit 26A is vertically moved. This is the explanation of the structure of the system for vertically moving the outlet unit 26.

The vertically movable frame 64 has bushes 671 and 671 disposed in the vicinity of both ends so as to extend vertically, and the bushes 671 and 671 have rods 68 and 68 passing toward upward therethrough. The rods 68 have upper ends coupled to racks 67 along the vertical direction, and the racks 67 mesh with pinions (not shown). The pinions are coupled to the spindles of servo motors 69 disposed on a carriage 11. When the servo motors 69 are driven to rotate the pinions so as to lift the rods 68 by the linear movement given by a combination of the pinion and the rack 67 in each pair, stoppers 71, which are disposed on lower ends of the rods 68, are brought into contact with the bushes 671 to lift the vertically movable frame 64 with the result that the vertically movable frame 64 is vertically moved. Thus, the outlet unit 26A is moved upward. Such upward movement is made to withdraw the outlet units 26 from the roller conveyor 24 for maintenance or the like, not for the purpose of air-cooling and tempering a glass sheet.

The above-mentioned system for vertically moving the outlet unit 26A is provided to the other outlet units 26B to 26J as well. The servo motors 51 of the these systems are all controlled by the motion controller 18 (see FIG. 1).

When the type of the glass sheet 20 is input from an external input unit into the motion controller 18, the motion controller prepares angular speed control data and vertical movement control data for the rollers 24A to 24J and vertical movement control data for the outlet units 26A to 26J so as to correspond to the curvature of the glass sheet 20. Then, the motion controller controls the servomotors 34 based on the angular speed control data thus prepared and the servomotors 50 and 51 based on the vertical movement control data thus prepared. In other words, the motion controller 18 carries out multi-axis control over the respective rollers 24A to 24J and the outlet units 26A to 26J such that the glass sheet 20 bent in the forming furnace 16 is conveyed, keeping the bent shape.

Next, the multi-axis control method for the rollers 24A to 24J and the outlet units 26A to 26J by the motion controller 18 will be described. The upward and downward movements of the rollers and those of the outlet units are basically done in such a way that the downward and upward movements are done on the rollers 24A to 24J in this order and on the outlet units 26A to 26J in this order in according to the conveyance of the glass sheet 20.

FIGS. 3(A) to (F) sequentially show the upward and downward movement of the rollers 24A to 24J in the order of from (A) to (F). The letters in the brackets in the following explanation correspond to the figure numbers of from FIG. 3(A) to FIG. 3(F).

Before the glass sheet 20 has been transferred onto the roller conveyor 24, the respective rollers 24A to 24J, and the respective outlet units 26A to 26J of the outlet unit 26 are all located at the highest position (see A). It should be noted that the rollers 24A to 24J and the outlet units 26A to 26J are disposed at corresponding positions in the vertical direction, respectively.

When the bent glass sheet 20 is transferred from the roller conveyor 22 onto the roller conveyor 24, the motion controller 18 performs such control that the glass sheet 20 is conveyed into the air-cooling/tempering apparatus 10 while the roller 24A and the outlet unit 26A are being moved downward so as to keep the glass sheet 20 in the bent shape in accordance with the vertical movement of the roller conveyor 22 (see B)

When the glass sheet 20 has been entirely conveyed into the air-cooling/tempering apparatus 10, outlet modules (upper outlet modules described later) 62 of the outlet units 24A to 24J of the outlet unit 26 inject air toward the top side of the glass sheet 20 during conveyance at the same time that outlet modules (lower outlet modules described later) 60 of the rollers 24A to 24J of the roller conveyor 24 inject air toward the bottom side of the glass sheet 20 during conveyance (see C).

The glass sheet 20 is air-cooled and tempered by blowing the air to both of the top side and the bottom side in a course where the glass sheet is passing between the upper and lower outlet modules 60 and 62 (see D).

Figure 3:
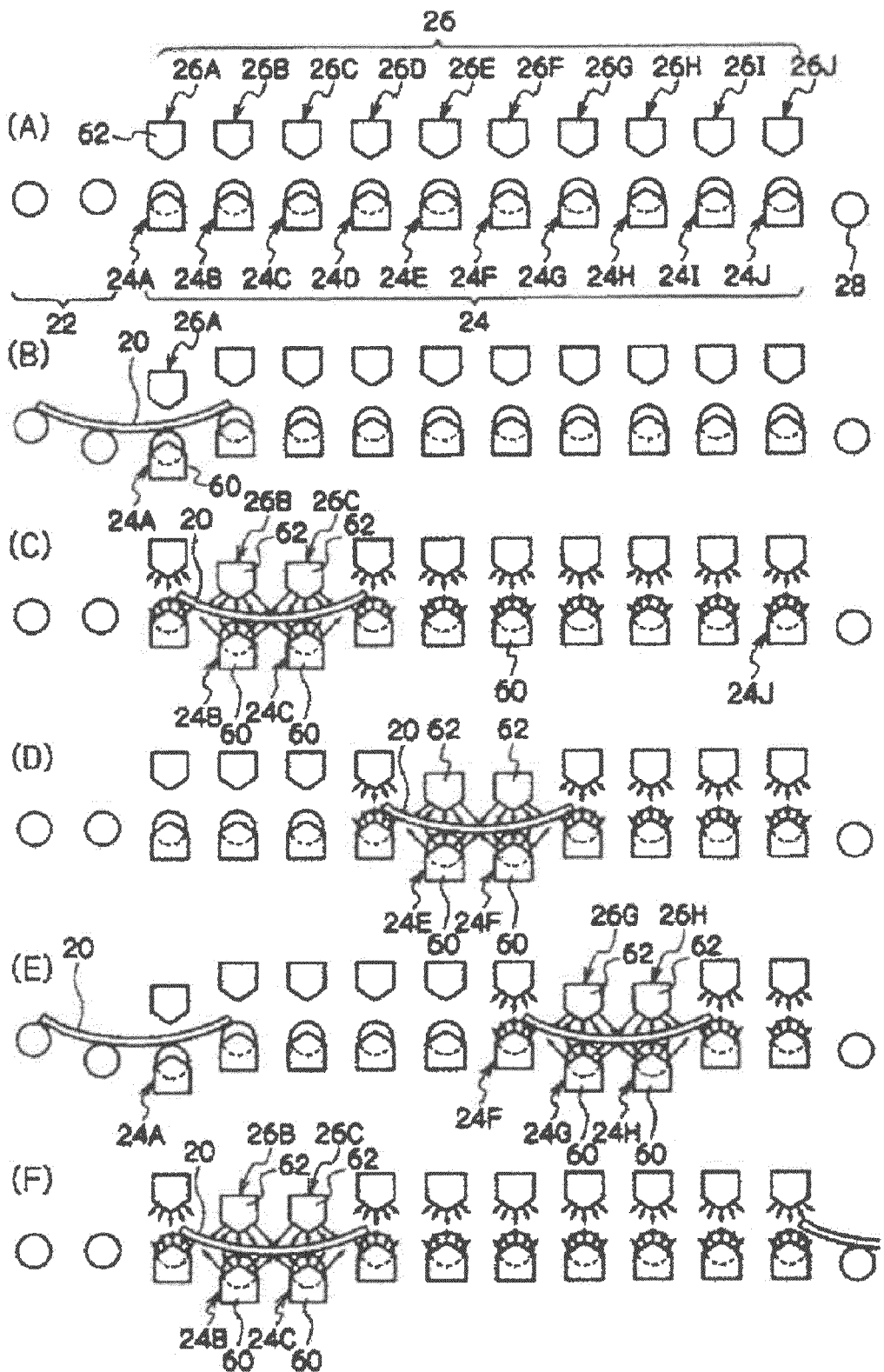
FIGS. 3(A) to (F) are views explaining the vertical movement of rollers in the air-cooling/tempering apparatus in accordance with a position where a glass sheet is located during conveyance.

When the glass sheet 20 transferred from the roller conveyor 22 has passed a first half area as shown in FIG. 3(E), the injection of the air by the outlet modules 60 and 62 in the first half area is stopped. While the glass sheet 20 is air-cooled and tempered in a second half area, the next glass sheet 20 to be air-cooled and tempered is conveyed into the first half area. When the next glass sheet 20 has been entirely conveyed into the first half area, the outlet modules 60 and 62 in the first half area inject air again to start air-cooling/tempering operation for the next glass sheet 20 as shown in FIG. 3(F).

Figure 5:
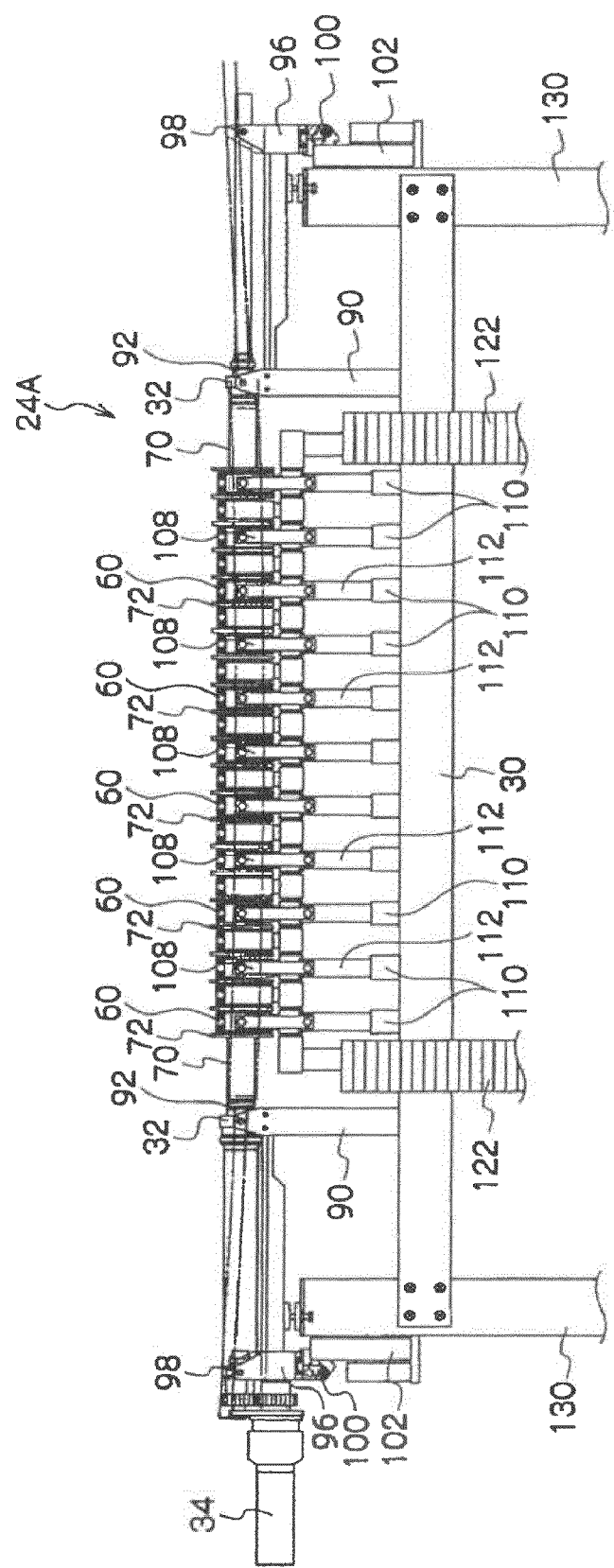
FIG. 5 is a view of the entire structure of a roller forming a roller conveyor of the air-cooling/tempering apparatus.
Figure 6:
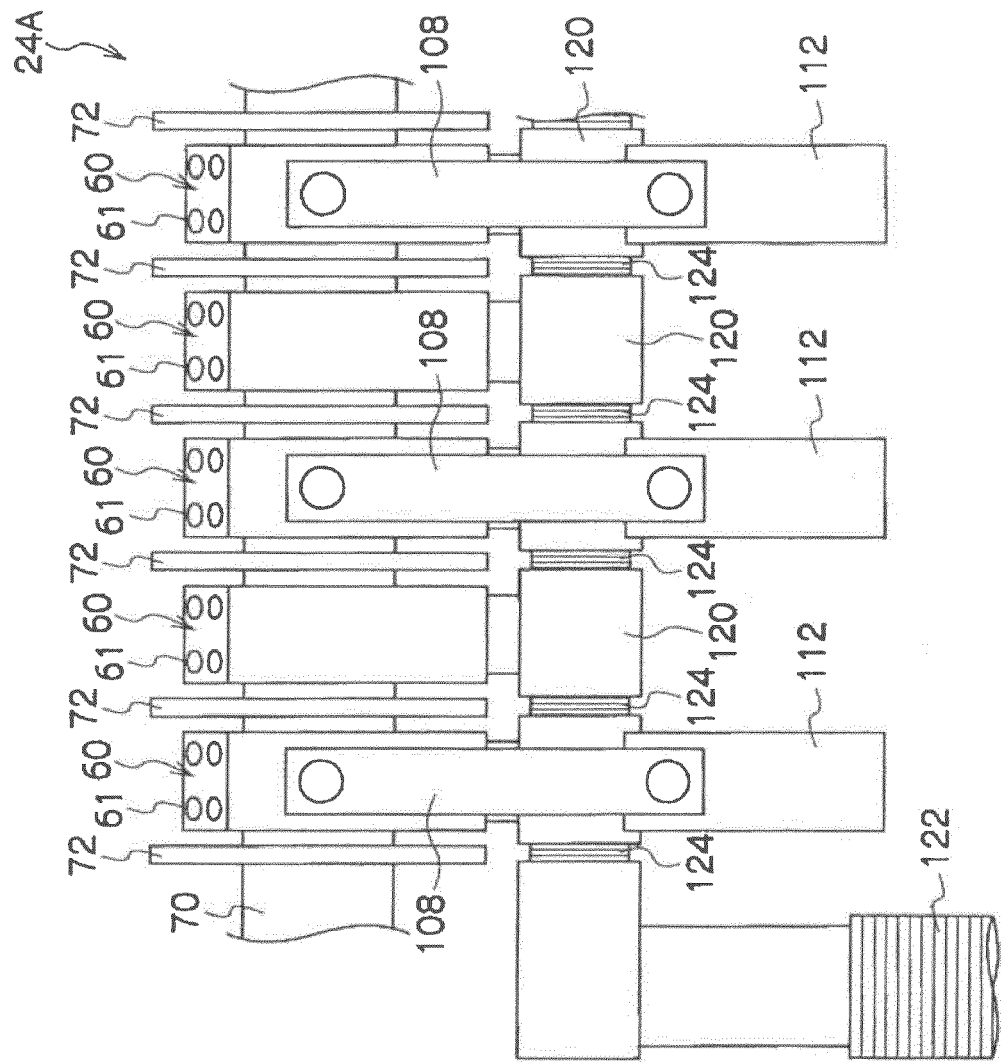
FIG. 6 is an enlarged view of essential parts of the roller shown in FIG. 5.
Figure 7:
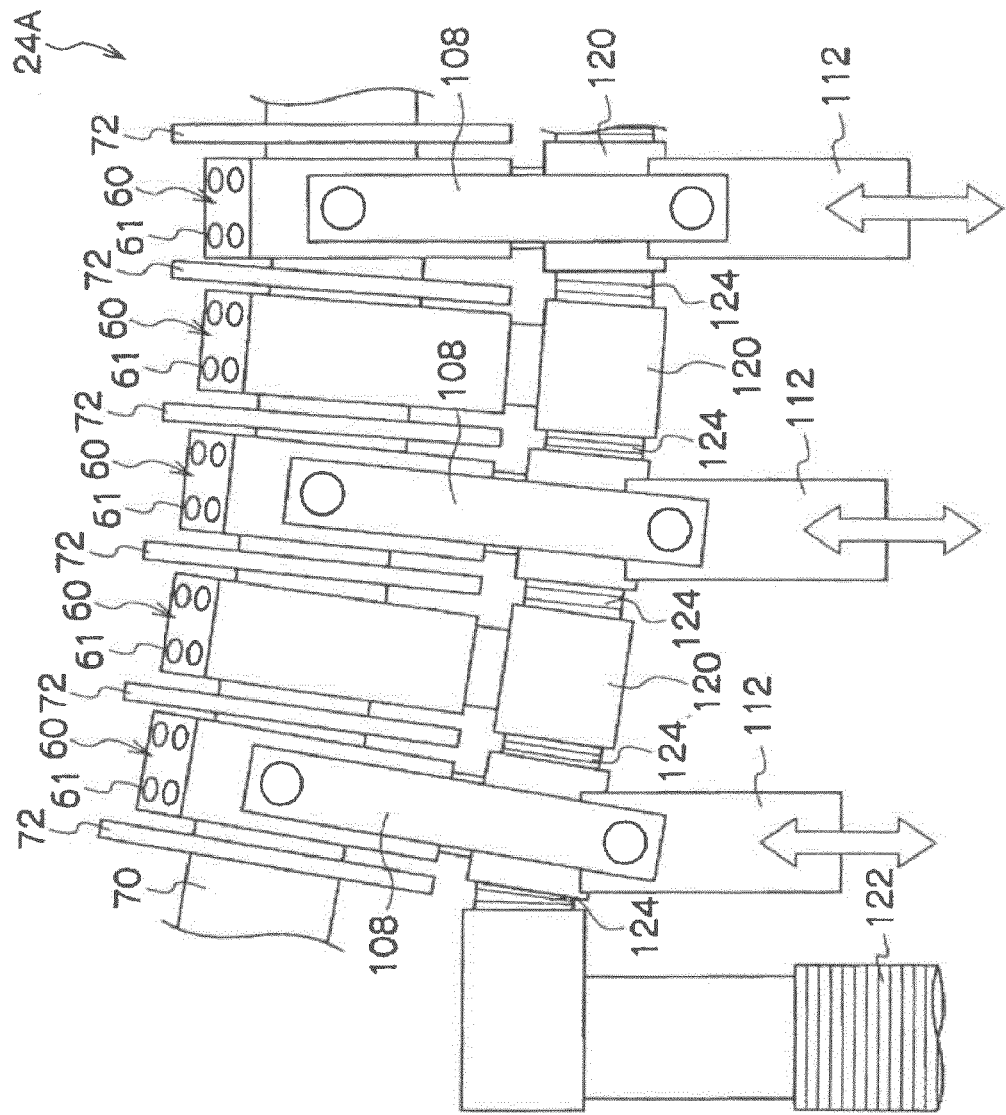
FIG. 7 is an enlarged view where the roller shown in FIG. 6 is curved.
Figure 8:
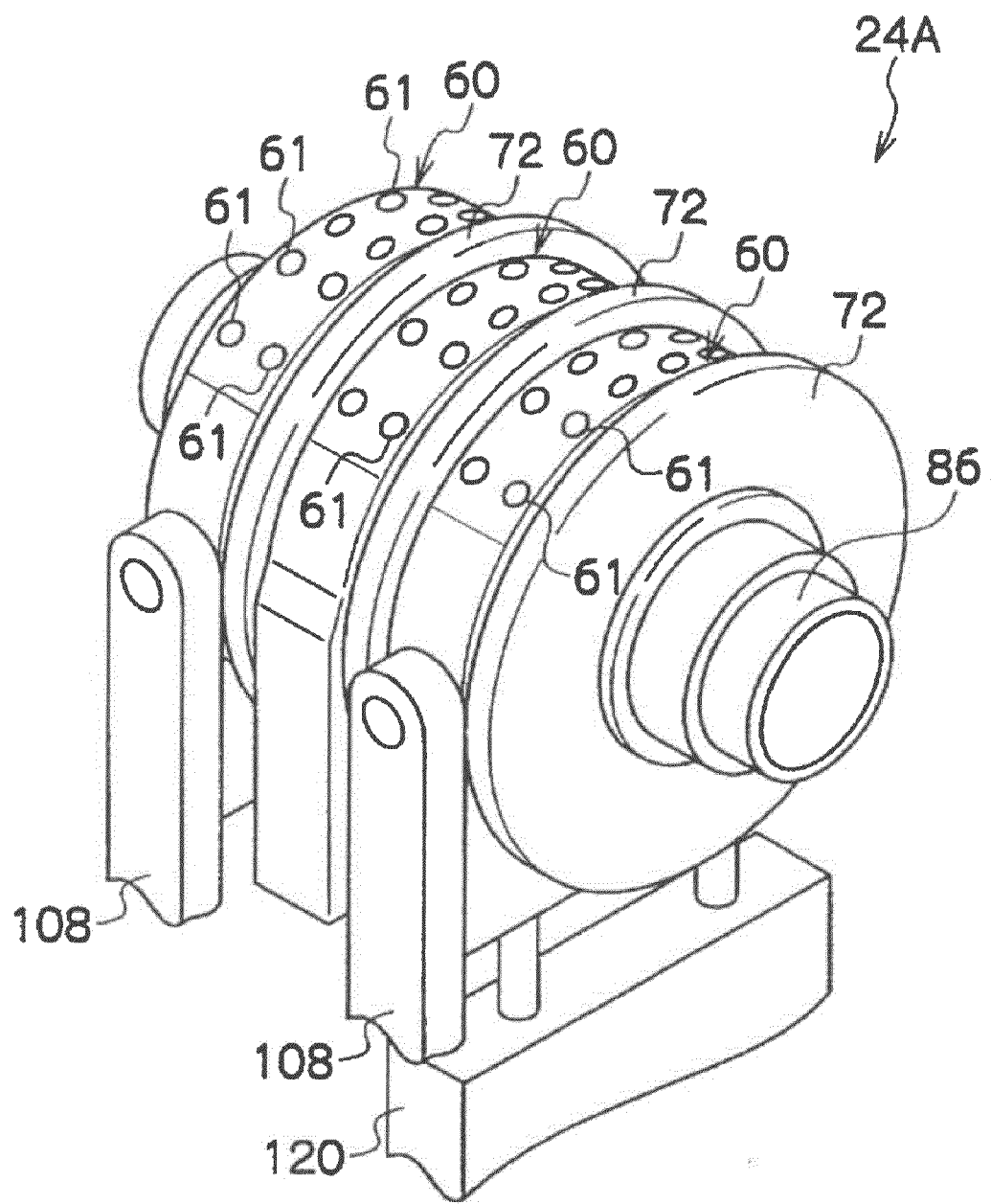
FIG. 8 is a perspective view of essential parts of the roller shown in FIG. 5.
Figure 9:
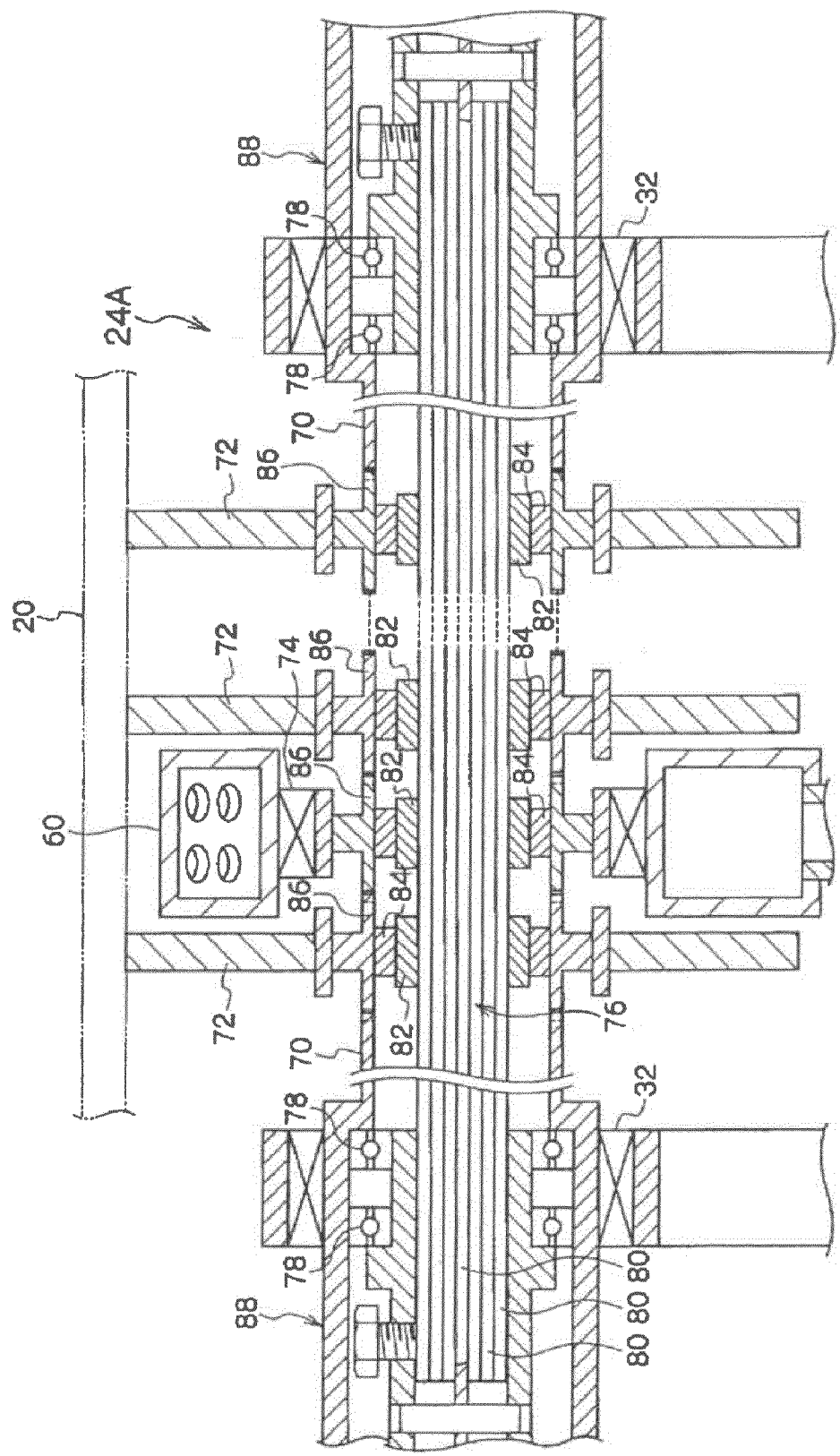
FIG. 9 is a cross-sectional view of the roller shown in FIG. 5 with the roller being shown so as to be partly omitted.

Now, the structures of the rollers 24A to 24J and the lower outlet modules 60 will be described in reference to FIG. 5 to FIG. 9. Since the respective rollers 24A to 24J have the same structure, explanation will be made only about the structure of the roller 24A, and the explanation of the structures of the other rollers 24B to 24J will be omitted. FIG. 5 is a general view of the roller 24A. FIG. 6 is an enlarged view of essential parts of the roller 24A which is not placed in a curved state. FIG. 7 is an enlarged view of the essential parts of the roller 24A which is placed in a curved state. FIG. 8 is a perspective view of lower outlet modules 60 disposed in the roller 24A. FIG. 9 is a cross-sectional view of the roller 24A which is shown so as to be partly omitted.

Figure 10:
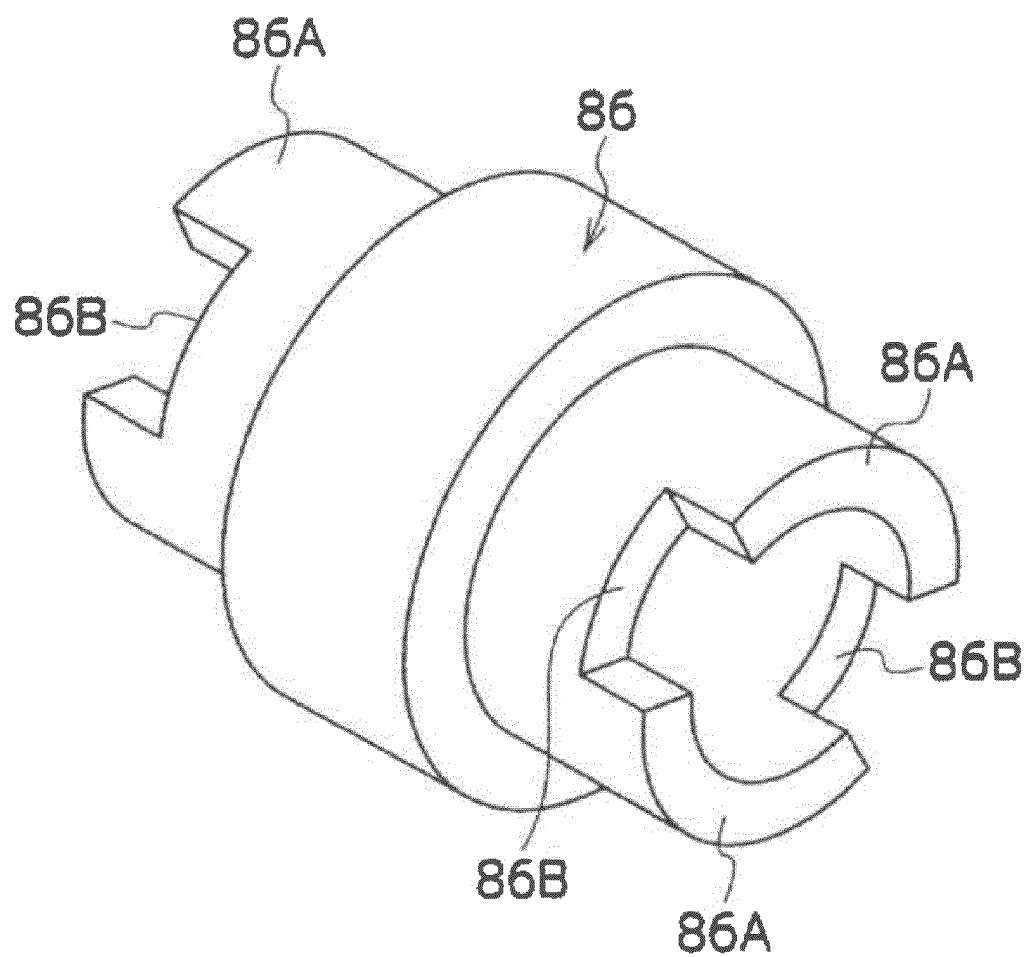
FIG. 10 is a perspective view of a ring roller forming the rotary shaft of the roller.

The roller includes a body between the bearings 32 and 32, which includes a guide shaft 76 permitting a bendable action, and a plurality of ring rollers 86 shown in FIG. 10, carried on the guide shaft, adjacent ring rollers being coupled by engagement. The ring rollers 86 are coupled so as to make the guide shaft 76 bendable, thereby to make the roller body bendable. The roller body, which is formed by coupling the ring rollers 86, has both ends connected to coupling pipes 70, which have end portions supported by the supports 90 via the bearings 32. Disc rollers 72 are integrally formed on ring rollers 86 by being fixed to the ring rollers 86 or by machining the ring rollers 86. The disc rollers 72 are disposed at such positions that the disc rollers 72 of adjacent rollers 24A to 24J do not overlap in the conveying direction of the glass sheet 20. On the other hand, an outlet module 60 is disposed on the ring roller 86 between adjacent disc rollers 72 via a bearing 74.

The structure of the roller 24A will be described in detail based on FIG. 9. The ring rollers 86 are formed in a hollow shape, the guide shaft 76 passes through the ring rollers 86 so as to permit a bendable action, and the coupling pipes 70 are rotatably supported on both end portions of the guide shaft 76 via bearings 78.

The guide shaft 76 may be configured by stacking seven band-shaped members 80, such as flat bars. It should be noted that the number of the band-shaped members 80 is not limited to seven. The band-shaped members 80 are preferably made of such a metal material to have a rigidity and be easily bendable, specifically made of spring steel, stainless steel or the like.

The guide shaft 76 is fit into cylindrical holding members 82 so as to be prevented from being disassembled. The holding members 82 are disposed on the guide shaft 76 at intervals in a longitudinal direction of the guide shaft. The ring rollers 82 are rotatably supported on outer peripheries of the holding members 82 via self-lubricating slide bearings 84, which are made of brass for example.

Each of the ring rollers 86 has paired convex portions 86A and paired concave portions 86B formed at symmetrical positions on both ends thereof as shown in FIG. 10. The roller body is configured by fitting the convex portions 86A into the concave portions 86B between adjacent ring rollers 86 to couple the ring rollers 86.

In the present invention, the rotary shaft that forms the roller body of the roller conveyor means a shaft-shaped rotary structure, which is obtainable by coupling a plurality of ring rollers as described above. It is preferred that the rotary shaft be a rotary structure, which can make a rotary action and a bendable action, and which is obtainable by coupling a plurality of ring rollers rotatably carried on the guide shaft permitting a bendable action as in this embodiment. As long as this type of rotary shaft is employed, the shape, the bearing structure and the like may be modified without need of the use of the above-mentioned guide shaft. For example, the rotary shaft may be configured by coupling a plurality of ring rollers with flexible members.

It is sufficient that the guide shaft is a shaft permitting a bendable action. The shaft may be a solid shaft that can be elastically deformable, or a shaft obtained by coupling gears for example.

The disc-shaped members, which are other constituent members of the roller body, are members disposed on the rotary shaft at intervals and to convey a heated glass sheet by rotary movement of the rotary shaft. Normally, the disc-shaped members are preferably disc-shaped rollers, such as disc rollers as in this embodiment.

Figure 14:
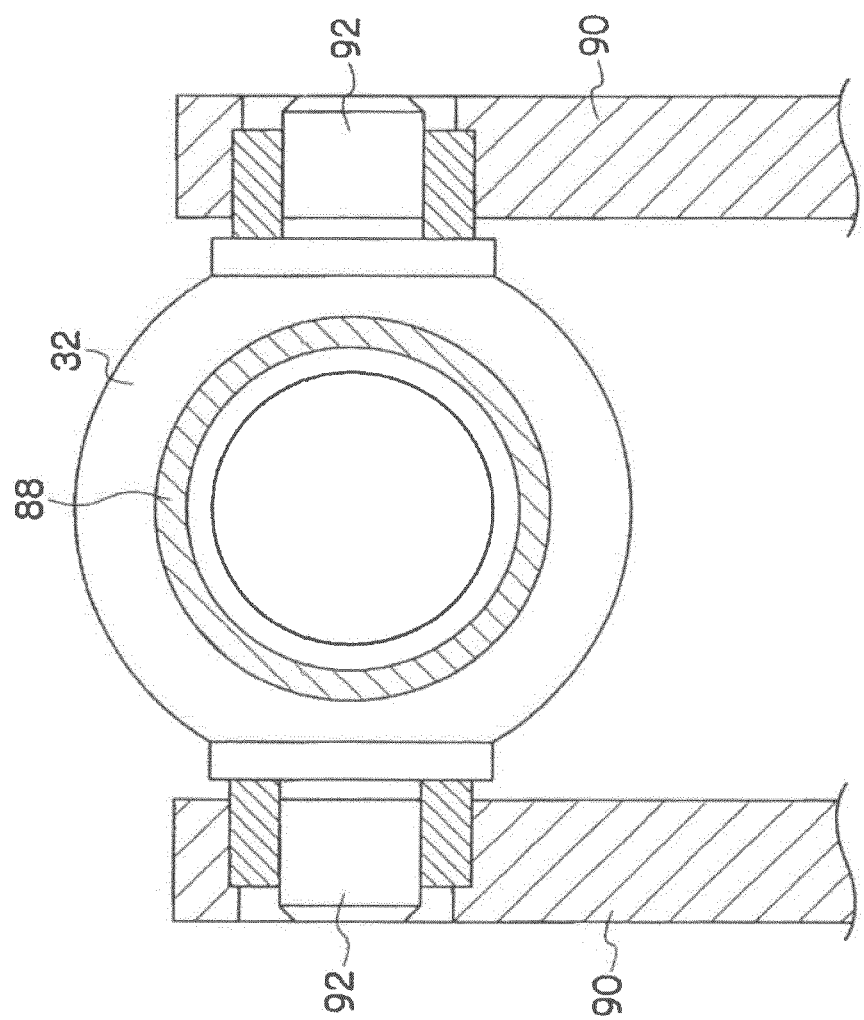
FIG. 14 is a cross-sectional view showing the structure of a bearing portion of a lower outlet unit.

Each coupling pipe 70 has an outer cylinder 88 integrally coupled thereto, the outer cylinder having a larger diameter than the coupling pipe. Each outer cylinder 88 has one end portion supported by the support 90 via the bearing 32. Each bearing 32 is supported by each support 90, which is disposed so as to clamp the outer cylinder 88 via a pair of pins 92 disposed in each support in the horizontal direction as shown in FIG. 14. Each outer cylinder 88 is configured so as to be elastic and flexible, using the pins 92 as pivots, as shown by chain double-dashed lines in FIG. 5.

Figure 11:
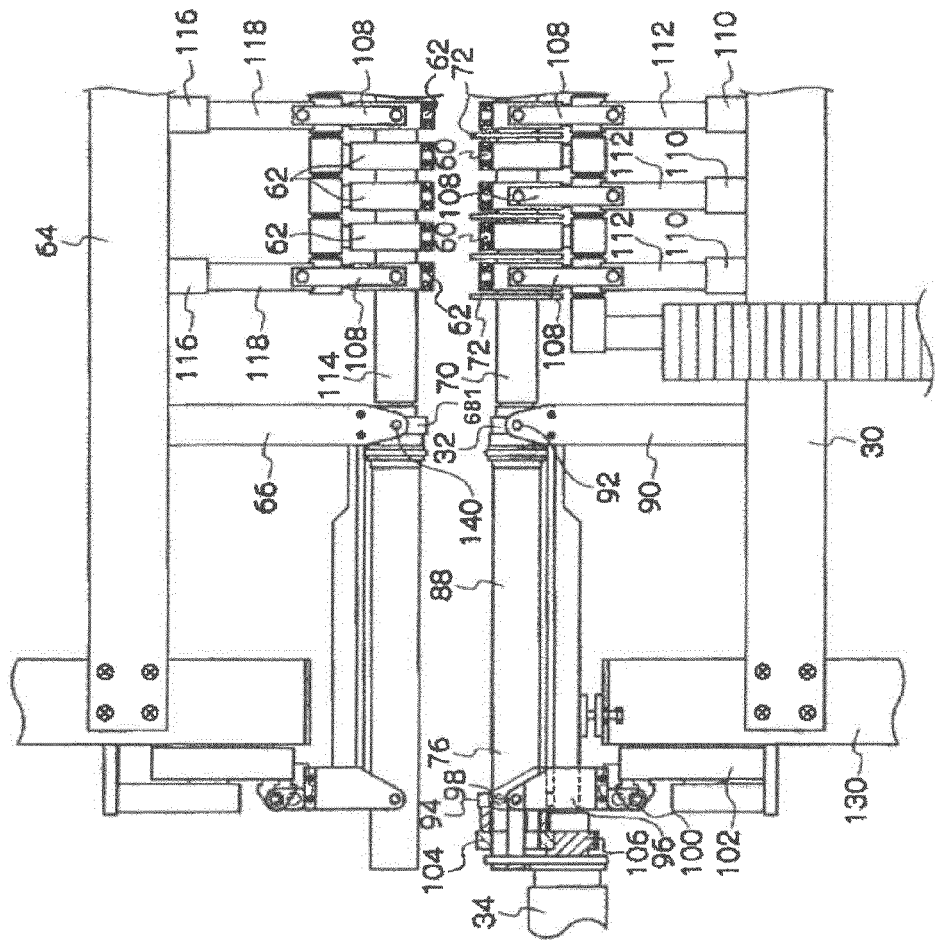
FIG. 11 is an enlarged view showing essential parts of a portion of a roller-inclining system.

Each outer cylinder 88 has the other end portion coupled to a bracket 96 via a bearing 94 as shown in FIG. 11. Since the bearing 94 is swingably coupled to the bracket 96 via a pin 98 disposed in the horizontal direction, the bearing permits the outer cylinder 88 to be inclined as shown by the chain double-dashed lines in FIG. 5 when the bracket 96 is moved upward.

As shown in FIG. 11, each bracket 96 has a lower portion coupled to a slider 100, which is engaged with a guide 102 permitting the vertical movement of the slider 100. The guide 102 is fixed to each guide member 130.

The outer cylinder 88 has a left end portion coupled to the spindle of the servomotor 34 via gear 104 and a gear 106. When the servomotor 34 is driven, its power is transmitted to the coupling pipe 70 via the gear 106, the gear 104 and the outer cylinder 88 to rotate the coupling pipe 70 so as to rotate the ring rollers 86, with the result that the disc rollers 72 are rotated. The gear 106 is rotatably supported by the bracket 96.

The outlet modules 60 are disposed on ring rollers 86 via their bearings 74 as shown in FIG. 9. The outlet modules 60 are formed in a substantially semicircular shape having a thickness and have such semicircular portions held by holders 108 as shown in FIG. 8. The holders 108 have lower ends swingably, at connecting portions, to the leading edges of vertically movable rods 112 of servomotors 110 as shown in FIG. 5 and FIG. 11.

When the servomotors 110 are driven to move the vertically movable rods 112 downward, the downward movement is transmitted to the outlet modules 60 via the holders 108 and is further transmitted from the outlet modules 60 to the guide shaft 76 via the bearings 74, the ring rollers 86, the slide bearings 84 and the holding members 82. Thus, the guide shaft 76 is bent downward because of having elasticity, and in synchronization with the downward bent of the guide shaft, the ring rollers are coupled together in an inclined form, with the result that the conveying plane defined by the ring rollers is curved as shown in FIG. 7. In other words, a combination of the vertical positions of the plural vertical movable rods 112 and the inclination of the outer cylinders 88 caused by the upward movement of the brackets 96 can flex the guide shaft 76 in a desired form in a direction perpendicular to the conveying direction of the glass sheet. By controlling the downward flexure of the respective coupling pipes 70 caused by the plural servomotors 110 disposed along the axial direction of the coupling pipes 70, the roller 24A can be curved in a convex form facing downward as shown in the chain double-dashed lines in FIG. 5.

Explanation of how to bend the outlet units 26A to 26J and the bending systems for these outlet units will be simply described since how to bend these outlet units and the bending systems are substantially the same as how to bend the roller 24A and the bending system for this roller except for the outlet units 26A to 26J have no disc rollers 72.

Figure 13:
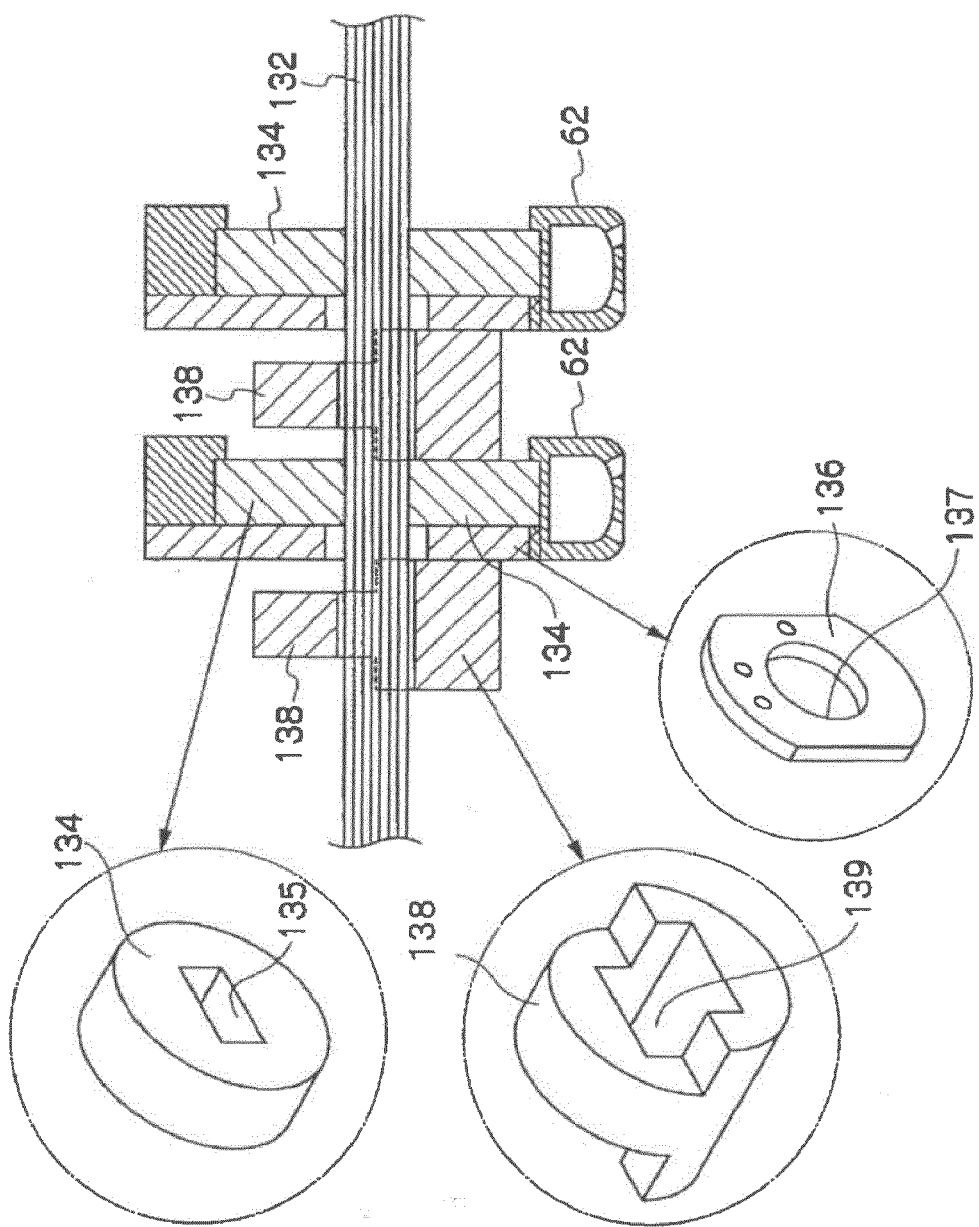
FIG. 13 is a cross-sectional view showing essential parts of the structure of an upper outlet unit.

As shown in FIG. 13, the outlet modules (upper outlet modules) 62 of the outlet units 26A to 26J are carried, via doughnut-shaped collar 134, on a guide shaft (outlet supporting shaft) 132, which is bendable. The guide shaft 132 and the outlet modules 62 are the same as those for the rollers 24. Each collar 134 is fixed to its associated outlet module 62 via a doughnut-shaped collar-securing cover 136 by unshown bolts. Adjacent modules 62 are spaced by a spacer 138, which is formed in a substantially cylindrical shape. The collars 134, the collar-securing covers 136 and the spacers 138 have openings 135, 137 and 139 formed therein so as to have the guide shaft 132 passing therethrough. In particular, the openings 135 and 139 are formed in a rectangular shape so as to fit the guide shaft 132 thereinto.

The guide shaft 132 has both end portions fixed to the outer cylinders 114. Each outer cylinder 114 has one end portion formed with a bracket and a slider so as to be vertically movable as in the rollers 24. Each outer cylinder 114 has the other end supported by the supporting member 66 via a pin 140. Each outer cylinder 114 is configured to be inclinable, being pivoted by the pin 140.

The outlet modules 62 are held by holders 108. In the case shown in FIG. 11, the holders 108 are disposed for every three outlet modules 62. The holders 108 are vertically coupled to vertically movable rods 118 of servomotors 116 disposed on a vertical movable frame 64.

When the servomotors 116 are driven to move the vertically movable rods 118 downward, the power is transferred to the outlet modules 62 via the holders 108 and is further transmitted from the outlet modules 62 to the guide shaft 132 shown in FIG. 13. Thus, the guide shaft 132 is downward flexed because of having elasticity, with the result that the outlet unit 26A is flexed. In other words, a combination of vertical positions of the plural vertically movable rods 118 and an inclination of each outer cylinder 114 can flex the guide shaft 132 in a desired form in the direction perpendicular to the conveying direction for the glass sheet. Thus, by controlling the downward flexure of the guide shaft 132 caused by the servomotors 116, it is possible to curve the outlet unit 26A in a convex form facing downward. The outlet unit 26 does not need to have an elevating system since the outlet unit is not brought into direct contact with a glass sheet and is not required to have a fine shape accuracy to the same level as the roller conveyor 24.

The servomotors 110 and 116 are all controlled by the motion controller shown in FIG. 1. When the type of the glass sheet 20 is input into the motion controller 18 from the external input unit, the motion controller prepares curvature control data for the rollers 24A to 24J and curvature control data for the outlet units 26A to 26J, which correspond to a desired curvature for the glass sheet 20 of this type. The motion control controls the servomotors 110 and 116 based on the prepared curvature control data. Specifically, the motion controller 18 carries out not only multi-axis control over the curvature of the respective rollers 24A to 24J so as to convey the glass sheet 20, keeping the shape bent in the forming furnace 16, but also multi-axis control over the curvature of the respective outlet units 26A to 26J so that equalize the distance between each of the outlet modules 62 of the outlet unit 26A to 26J and the glass sheet 20.

On the other hand, the outlet modules 60 have a plurality of air injection ports 61 formed thereon as shown in FIG. 6 to FIG. 8. The air injection ports 61 communicate with flexible ducts 122 via pipes 120 (FIG. 6) coupled to the hollow outlet modules 60 and further communicate with lower blowing boxes 123 (see FIG. 4) via the flexible ducts 122. The lower blowing boxes 123 are connected to an unshown blower. The blower supplies the lower blowing boxes 123 with air, which is blown into the outlet modules 60 from the flexible ducts 122 via the pipes 120 and then is injected from the air injection ports 61 toward the bottom side of the glass sheet 20.

Figure 12:
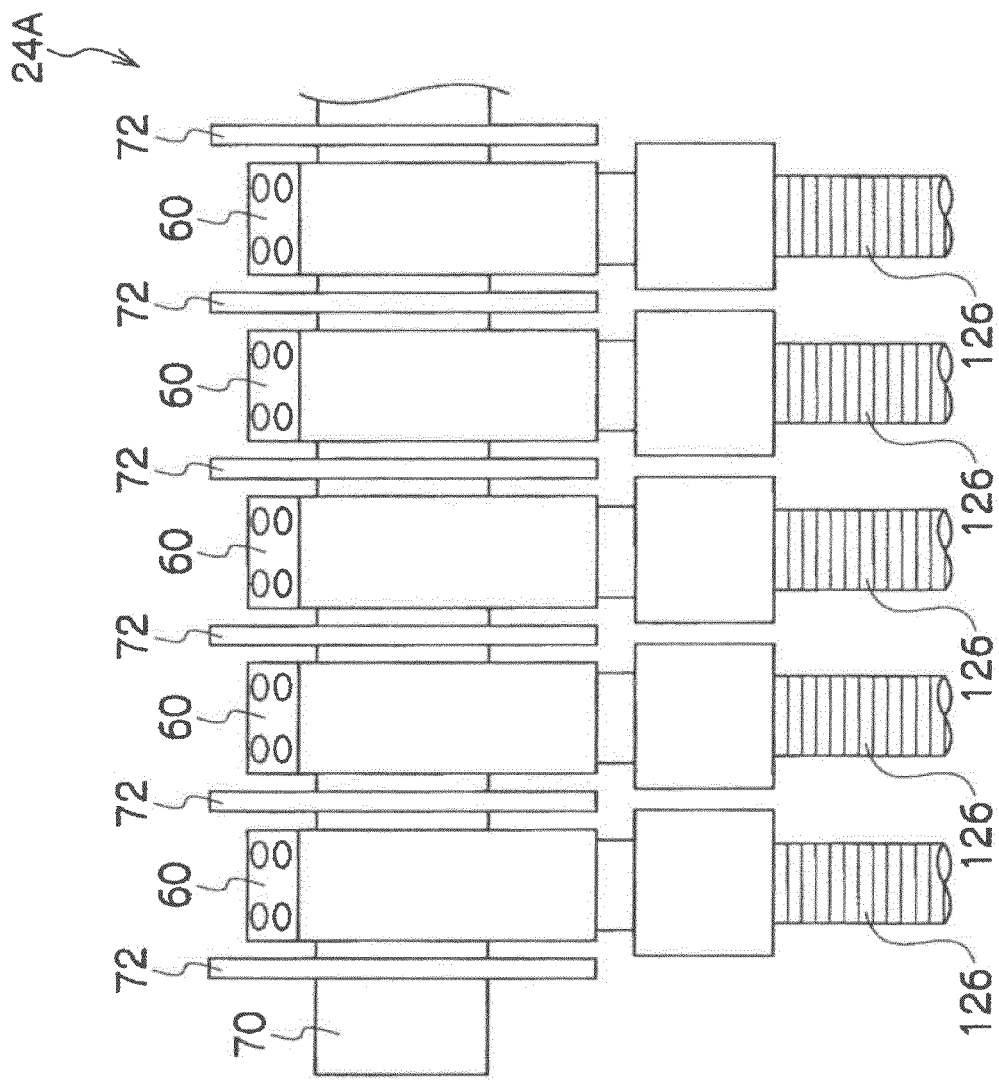
FIG. 12 is an enlarged view of essential parts of an air supply system according to another embodiment, which is employed for outlet modules.

The respective pipes 120 may include flow control valves such that the amounts of air injected from all outlet modules 60 are made constant. Reference numeral 124 in FIGS. 6 and 7 indicates flexible hoses for coupling adjacent pipes 120, and these flexible hoses 124 absorb the difference in height between adjacent outlet modules 60. All outlet modules 60 may be supplied with air by a single flexible duct 122 as shown in FIGS. 6 and 7. On the other hand, the respective outlet modules 60 may be connected to their own flexible ducts 126 so as to be supplied with air, respectively, as shown in FIG. 12. In the latter case, the pipes 120 and the flexible hoses 124 shown in FIGS. 6 and 7 are unnecessary.

Now, the features of the air-cooing/tempering apparatus 10 constructed above will be described.

Since the air-cooling/tempering apparatus 10 is configured such that each outlet module 60 is disposed between adjacent disc rollers 72 carried on ring rollers 86 of the roller 24A as shown in FIGS. 6 to 9, it is possible to bring air from the outlet modules 60 to a portion of the glass sheet 20 in contact with the disc rollers and its close portion, i.e. portions of the glass sheet that have not been supplied with such air in the conventional air-cooling/tempering apparatuses. Thus, it is possible not only to uniformly air-cool and temper the glass sheet 20 as a whole without being affected by the pitch between adjacent rollers and the diameter of the rollers but also to prevent the reheating phenomenon from causing in the glass sheet 20, with the result that it is possible to effectively air-cool and temper the glass sheet 20 as a whole.

Since the disc rollers 72 on the roller 24A to 24J are disposed so as not to overlap the disc rollers 72 on their adjacent rollers with respect to the conveying direction of the glass sheet 20, a portion of the glass sheet 20 that has been brought into contact with the disc rollers on a roller is reliably air-cooled by the air injected from the outer modules 60 on the next roller when passing on the next roller. Thus, it is possible to prevent the reheating phenomenon from causing in such a portion of the glass sheet 20 that has been brought into contact with the disc rollers on the preceding roller.

As shown in FIG. 8, each outlet module 60 has an inclined surface formed on a side confronting the glass sheet 20, and the inclined surface has a gentle curvature and has air injection ports 61 substantially uniformly formed therein. By this arrangement, while the glass sheet 20 is conveyed on the disc rollers 72, air is blown at substantially equal pitch toward the bottom side of the glass sheet 20 as shown by arrows in FIG. 15. This is also applicable to the air-blowing from the outlet modules 62. It is possible to air-cool and temper the glass sheet 20 more uniformly by the air-blowing action given by the outlet modules 60 and 62. Although the side of each outlet module 60 confronting the glass sheet 20 shown in FIG. 8 is formed so as to be parallel with respect to an axial direction of the roller 24A, the side may be formed of inclined surfaces, which inclines from a boundary (peak) at the center with respect to the axial direction of the roller 24A.

Figure 15:
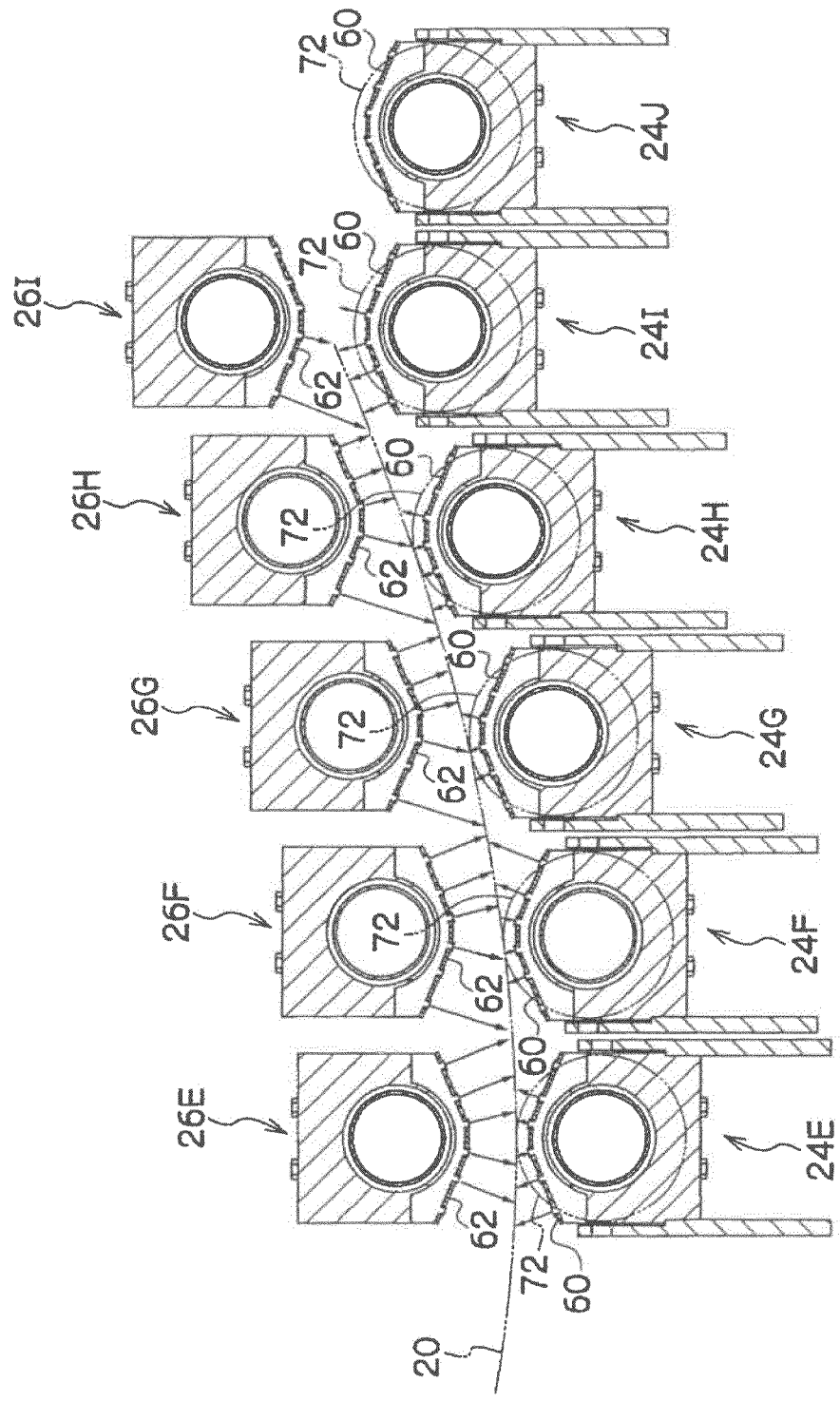
FIG. 15 is a cross-sectional view explaining how to vertically move respective rollers of the roller conveyor.
Figure 16:
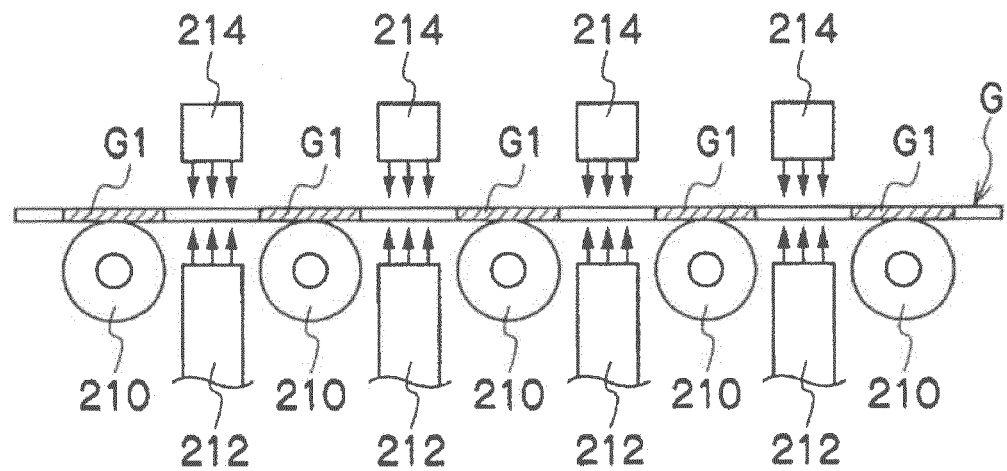
FIG. 16 is a side view of an air-cooling/tempering apparatus for explanation of the reheating phenomenon.
Figure 17:
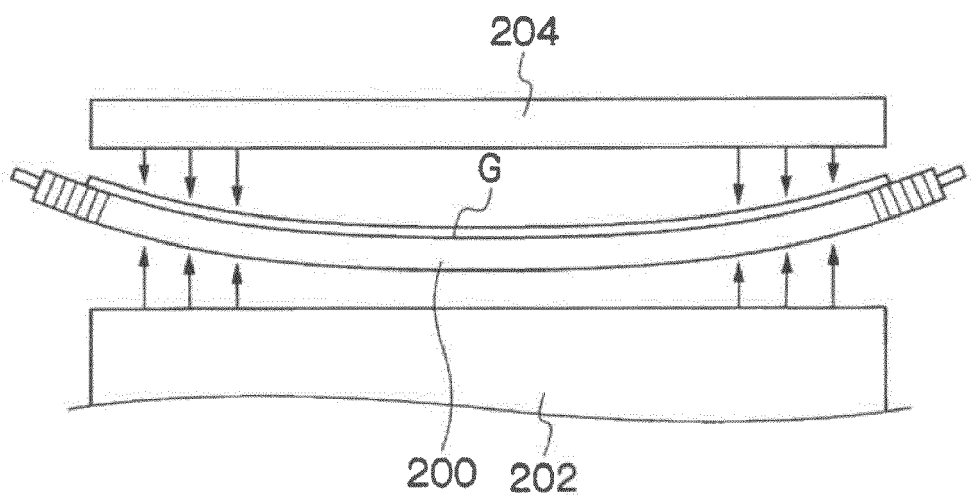
FIG. 17 is a schematic front view for explanation of the problem caused when air-cooling/tempering operation is performed with curved rollers being used.

In accordance with this air-cooling/tempering apparatus 10, the glass sheet 20, which has bent in the forming furnace 12 before the air-cooling/tempering apparatus 10, can be air-cooled and tempered while the respective rollers 24A to 24J of the roller conveyor 24 are vertically moved as shown in FIG. 15 so as to keep that the bent shape of the glass sheet 20, i.e. the shape of the glass sheet 20 bent along the conveying direction. Since the outlet modules 60 are vertically moved along with the rollers 24A to 24J in an integrated fashion to constantly make the distance between each of the outlet modules 60 and the glass sheet 20 constant, it is possible to uniformly temper the glass sheet 20 as a whole.

The rollers 24A to 24J are appropriate to convey a glass sheet 20 having a complex shape curved both in a conveying direction of the glass sheet 20 and the direction perpendicular to the conveying direction because of being curved rollers curving in the direction perpendicular to the conveying direction of the glass sheet 20. Even if the glass sheet is a backlite having a complicatedly bent peripheral edge portion, it is possible to direct the outlet modules 60 toward such a peripheral portion since the rollers 24A to 24J can be curved along the shape of such a peripheral edge portion by the servomotors 110. In this way, it is possible to temper even a glass sheet having a complicatedly bent peripheral edge portion as in the remaining portions since it is possible to bring air vertically to such a peripheral edge. Even if the glass sheet 20 has a complicated shape as in, e.g. a backlite, it is possible to uniformly air-cool and temper the glass sheet 20 as a whole. It is possible to cope with a complicated shape since the conveying plane can be formed so as to have a desired curve by the servomotors 110 and 116. The present invention is also applicable to a case where the rollers are vertically moved only on opposed sides without using the servomotors 110 and 116, although there is no degree of freedom in formation of a curved plane since the formation of a curve is formed only by flexure. The guide shaft may be an initially curved roller, although this guide shaft has no versatility. The present invention is also applicable to a case where non-curved rollers are employed. In other words, even when a flat glass sheet is cooled (or subjected to air-cooling/tempering), the present invention has an advantage of avoiding reheat. The present invention is applicable to all types of cooling operation for a glass sheet while the glass sheet is conveyed on rollers.

Further, it is possible to effectively temper the glass sheet 20 since the glass sheet has both top and bottom sides simultaneously cooled by injecting air from the outlet unit 26 toward the top side of the glass sheet 20 as well. It is possible to uniformly subject the glass sheet 20 as a whole to air-cooling/tempering operation since the curvature of the respective outlet units 26A to 26J is subjected to multi-axial control so as to equalize the distance between each of the outlet modules 62 and the glass sheet 20 by the motion controller 18.

INDUSTRIAL APPLICABILITY

The present invention is applicable to the production of tempered glass, which is used for transportation vehicles, such as automobiles, ships, rail vehicles, airplanes, for buildings or for various other applications, in particular, the production of tempered glass having a complicated curved surface as in automobile sidelites and backlites The entire disclosure of Japanese Patent Application No. 2008-093474 filed on Mar. 31, 2008 including specification, claims, drawings and summary is incorporated herein by reference in its entirety.

What is claimed is:

1. An air-cooling/tempering device for air cooling and tempering a glass sheet heated to a temperature by a heating furnace, the air cooling/tempering device comprising:
   a roller conveyor configured to air-cool and temper the glass sheet by conveying the heated glass sheet along a conveying plane defined by a plurality of rollers of the roller conveyor while air is blown toward a bottom side of the glass sheet conveyed by the roller conveyor, wherein each of the plurality of rollers of the roller conveyor comprises:
   a rotary shaft,
   a plurality of disc members carried on the rotary shaft at intervals and configured to have contact with the bottom side of the glass sheet, and
   a plurality of lower outlet modules disposed so as to be swingable with respect to the rotary shaft, each of the lower outlet modules being disposed between adjacent disc members and having an air injection port formed on a side confronting the glass sheet; and
   a drive unit configured to vertically move the plurality of rollers so as to curve a portion of the conveying plane in a conveying direction of the glass sheet.

2. The air-cooling/tempering device according to claim 1, wherein the disc members are disposed at positions so as not to overlap disc members on an adjacent roller with respect to a conveying direction of the glass sheet.

3. The air-cooling/tempering device according to claim 1, wherein the rotary shaft comprises:
   a guide shaft permitting a bendable action, and
   a plurality of ring rollers rotatably carried on the guide shaft and coupled together.

4. The air-cooling/tempering device according to claim 1, wherein:
   each of the lower outlet modules have an inclined surface in a conveying direction of the glass sheet, and
   the air injection port is formed in the inclined surface.

5. The air-cooling/tempering device according to claim 1, wherein the drive unit is further configured to vertically move the plurality of rollers according to a conveyed position of the glass sheet.

6. The air-cooling/tempering device according to claim 1, wherein the plurality of rollers comprise bendable rollers, which are bendable in a direction perpendicular to a conveying direction of the glass sheet.

7. The air-cooling/tempering device according to claim 1, further comprising an outlet unit configured to inject air toward a top side of the glass sheet conveyed by the roller conveyor.

8. The air-cooling/tempering device according to claim 7, wherein the outlet unit comprises:
   a plurality of outlet supporting shafts disposed to confront the rollers of the roller conveyor, and
   a plurality of upper outlet modules carried on the outlet supporting shafts and having an air injection port formed on a side confronting the glass sheet.

9. The air-cooling/tempering device according to claim 8, wherein the drive unit is configured to vertically move the outlet supporting shafts such that the drive unit vertically moves the plurality of outlet supporting shafts according to a conveyed position of the glass sheet so as to vertically move the upper outlet modules.

10. The air-cooling/tempering device according to claim 8, wherein the plurality of outlet supporting shafts comprise bendable rollers.

11. The air-cooling/tempering device according to claim 1, wherein the air injection ports including a first group of air injection ports configured to vertically bring air to the glass sheet passing just above the roller.

12. A method for air-cooling and tempering a glass sheet, comprising:
   heating a glass sheet to a temperature by a heating furnace, and
   air-cooling and tempering the heated glass sheet by use of the air-cooling/tempering device for a glass sheet, comprising a roller conveyor configured to air-cool and temper the glass sheet by conveying the heated glass sheet along a conveying plane defined by a plurality of rollers of the roller conveyor while air is blown toward a bottom side of the glass sheet conveyed by the roller conveyor, wherein each of the plurality of rollers of the roller conveyor comprises:
   a rotary shaft;
   a plurality of disc members carried on the rotary shaft at intervals and configured to have contact with the bottom side of the glass sheet; and
   a plurality of lower outlet modules disposed so as to be swingable with respect to the rotary shaft, each of the lower outlet modules being disposed between adjacent disc members of said plurality of disc members carried on the rotary shaft and having an air injection port formed on a side confronting the glass sheet, wherein said air cooling being performed while the heated glass sheet is conveyed along the conveying plane defined by the plurality of rollers of the roller conveyor; and
   vertically moving the plurality of rollers so as to curve a portion of the conveying plane in a conveying direction of the glass sheet.

13. The method according to claim 12, further comprising controlling at least the lower outlet modules so as to start air injection when the glass sheet conveyed by rollers has been entirely conveyed into the air-cooling/tempering device.

* * * * *